United States Patent
Akiyama et al.

(10) Patent No.: US 8,784,205 B2
(45) Date of Patent: Jul. 22, 2014

(54) GAME DEVICE, METHOD FOR CONTROLLING GAME DEVICE, PROGRAM, AND INFORMATION STORAGE MEDIUM

(75) Inventors: Masato Akiyama, Yokohama (JP); Hiroto Yamaguchi, Tokyo (JP); Kota Wakasa, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 13/988,395

(22) PCT Filed: Mar. 5, 2012

(86) PCT No.: PCT/JP2012/055537
§ 371 (c)(1),
(2), (4) Date: May 20, 2013

(87) PCT Pub. No.: WO2012/132770
PCT Pub. Date: Oct. 4, 2012

(65) Prior Publication Data
US 2013/0244780 A1    Sep. 19, 2013

(30) Foreign Application Priority Data

Mar. 30, 2011   (JP) ................. 2011-076705
Mar. 30, 2011   (JP) ................. 2011-076706

(51) Int. Cl.
G07F 17/32    (2006.01)

(52) U.S. Cl.
USPC ................. 463/31; 463/30; 463/34

(58) Field of Classification Search
USPC ................. 463/31, 30, 34
See application file for complete search history.

(56) References Cited

U.S. PATENT DOCUMENTS

| | | | |
|---|---|---|---|
| 8,360,836 B2 * | 1/2013 | Takehiro | 463/7 |
| 2004/0040434 A1 | 3/2004 | Kondo et al. | |
| 2007/0178974 A1 | 8/2007 | Masuyama et al. | |
| 2008/0058102 A1 * | 3/2008 | Hato | 463/35 |
| 2010/0141681 A1 | 6/2010 | Fujii | |
| 2011/0003639 A1 * | 1/2011 | Takehiro | 463/35 |
| 2011/0034247 A1 | 2/2011 | Masuda et al. | |
| 2011/0124385 A1 | 5/2011 | Otomo et al. | |
| 2011/0300939 A1 * | 12/2011 | Mao et al. | 463/36 |
| 2013/0040733 A1 * | 2/2013 | Yamamoto et al. | 463/31 |
| 2013/0045783 A1 * | 2/2013 | Yamamoto et al. | 463/7 |

FOREIGN PATENT DOCUMENTS

| | | |
|---|---|---|
| JP | 2001-170358 A | 6/2001 |
| JP | 2003-334387 A | 11/2003 |
| JP | 2004-86067 A | 3/2004 |
| JP | 2005-287786 A | 10/2005 |
| JP | 2005-287829 A | 10/2005 |
| JP | 2010-136107 A | 6/2010 |
| JP | 2011-30872 A | 2/2011 |
| KP | 2010-0087769 A | 9/2010 |

OTHER PUBLICATIONS

Japanese Office Action for JP 2011-076705 dated Mar. 21, 2012.

\* cited by examiner

*Primary Examiner* — Pierre E Elisca
(74) *Attorney, Agent, or Firm* — Sughrue Mion, PLLC

(57) ABSTRACT

Reference time data acquisition means (74) acquires, from means (70) for storing a position of display means (22) and reference time data representing a reference time at which a user should carry out a game operation in association with each other, the reference time data associated with the position of the display means (22) detected by position detection means (72). Based on the reference time data, display control means (76) controls the display means (22) to display a guidance image (58) for guiding the user regarding the reference time. The game operation carried out by the user is detected. Game operation evaluation means (80) evaluates the game operation performed by the user, based on the reference time data and a detection result by game operation detection means (78).

13 Claims, 14 Drawing Sheets

| POSITION | GUIDANCE SUBJECT PERIOD |
|---|---|
| HORIZONTAL POSITION | 1 BAR |
| VERTICAL POSITION | 1/2 BAR |

GAME DEVICE, METHOD FOR CONTROLLING GAME DEVICE, PROGRAM, AND INFORMATION STORAGE MEDIUM

CROSS REFERENCE TO RELATED APPLICATIONS

This application is a National Stage of International Application No. PCT/JP2012/055537 filed Mar. 5, 2012, claiming priority based on Japanese Patent Application Nos. 2011-076705 and 2011-076706 filed Mar. 30, 2011, the contents of all of which are incorporated herein by reference in their entirety.

TECHNICAL FIELD

The present invention relates to a game device, a method of controlling a game device, a program, and an information storage medium.

BACKGROUND ART

A game device for executing a game in which a user carries out a game operation to a music piece (hereinafter referred to as music game) is conventionally known (for example, Patent Literature 1).

Moreover, a game in which a user plays the game while changing a position of a game device is conventionally known. For example, Patent Literature 2 describes a game in which, when a predetermined game event occurs, a user places a game device in a given position.

CITATION LIST

Patent Literature

Patent Literature 1: JP 2003-334387 A
Patent Literature 2: JP 2010-136107 A

SUMMARY OF INVENTION

Technical Problem

In the conventional music game, a time (hereinafter referred to as reference time) when a user should carry out a game operation is determined in advance, and the user cannot intentionally change the time and may feel dissatisfied.

The present invention has been made in view of the above-mentioned problem, and therefore has an object to provide a game device capable of, in a music game in which a user carries out a game operation to a music piece, allowing the user to intentionally change a reference time, a method of controlling a game device, and a program.

Solution to Problem

In order to solve the above-mentioned problem, according to the present invention, there is provided a game device for executing a game in which a user carries out a game operation to a music piece, including: position detection means for detecting a position of display means; reference time data acquisition means for acquiring, from means for storing a position of the display means and reference time data representing a reference time at which the user should carry out the game operation in association with each other, the reference time data associated with the position of the display means detected by the position detection means; display control means for controlling, based on the reference time data associated with the position of the display means detected by the position detection means, the display means to display a guidance image for guiding the user in the reference time; game operation detection means for detecting the game operation carried out by the user; and game operation evaluation means for evaluating, based on the reference time data associated with the position of the display means detected by the position detection means and a detection result by the game operation detection means, the game operation carried out by the user.

Further, according to the present invention, there is provided a method of controlling a game device for executing a game in which a user carries out a game operation to a music piece, the method including: a position detection step of detecting a position of display means; a reference time data acquisition step of acquiring, from means for storing a position of the display means and reference time data representing a reference time at which the user should carry out the game operation in association with each other, the reference time data associated with the position of the display means detected in the position detection step; a display control step of controlling, based on the reference time data associated with the position of the display means detected in the position detection step, the display means to display a guidance image for guiding the user in the reference time; a game operation detection step of detecting the game operation carried out by the user; and a game operation evaluation step of evaluating the game operation carried out by the user based on the reference time data associated with the position of the display means detected in the position detection step and a detection result in the game operation detection step.

Further, according to the present invention, there is provided a program for causing a computer to function as a game device for executing a game in which a user carries out a game operation to a music piece, including: position detection means for detecting a position of display means; reference time data acquisition means for acquiring, from means for storing a position of the display means and reference time data representing a reference time at which the user should carry out the game operation in association with each other, the reference time data associated with the position of the display means detected by the position detection means; display control means for controlling, based on the reference time data associated with the position of the display means detected by the position detection means, the display means to display a guidance image for guiding the user in the reference time; game operation detection means for detecting the game operation carried out by the user; and game operation evaluation means for evaluating, based on the reference time data associated with the position of the display means detected by the position detection means and a detection result by the game operation detection means, the game operation carried out by the user.

Further, according to the present invention, there is provided a computer-readable information storage medium having the above-mentioned program recorded thereon.

According to the present invention, in a music game in which the user carries out the game operation to a music piece, it is possible to allow the user to intentionally change the reference time.

Further, according to an aspect of the present invention, the reference time data represents a reference time at which the user should carry out each of one or a plurality of types of the game operation, and the display control means guides the user in the each of the one or plurality of types of game operation by setting guidance areas corresponding to a number of types of game operation represented by the reference time data associated with the position of the display means detected by the position detection means on a game screen displayed on the display means, and controlling each of the set guidance areas to display the guidance image.

Further, according to an aspect of the present invention, the display control means guides the user in the each of the one or plurality of the game operation by moving, in the each of the guidance areas, the guidance image to a target position so that a distance between the guidance image and the target position corresponds to a remaining time before the reference time arrives.

Further, according to an aspect of the present invention, the game device further includes means for acquiring, from means for storing guidance subject period data in which the position of the display means and a guidance subject period which is a period for guiding the reference time are associated with each other, the guidance subject period data, and the display control means controls the display means to display the guidance image for providing guidance in the reference time in the guidance subject period associated with the position of the display means detected by the position detection means.

Further, according to an aspect of the present invention, the music piece is a music piece including parts of a plurality of musical instruments, and the reference time data acquisition means acquires, from means for storing the position of the display means and the reference time data corresponding to any one of the parts of the plurality of musical instruments in association with each other, the reference time data corresponding to any one of the parts of the plurality of musical instruments, which is associated with the position of the display means detected by the position detection means.

Further, according to an aspect of the present invention, the position detection means detects a position of the game device, and the game device further includes: game processing execution means for executing game processing corresponding to the game operation detected by the game operation detection means; means for acquiring, from means for storing reference position data in which a situation of the game and a reference position of the game device are associated with each other, the reference position data; position determination means for determining whether or not the position of the game device detected by the position detection means is the reference position associated with the situation of the game being executed; and game processing restriction means for restricting, based on a determination result by the position determination means, the execution of the game processing, which is executed by the game processing execution means and corresponds to the game operation detected by the game operation detection means.

Further, according to an aspect of the present invention, the reference position data is data in which a reference situation of the game and the reference position of the game device are associated with each other, and the position determination means determines, in a case where the situation of the game being executed is brought into the reference situation, whether or not the position of the game device detected by the position detection means is the reference position associated with the reference situation.

Further, according to an aspect of the present invention, the game device further includes means for, in the case where the situation of the game being executed is brought into the reference situation, guiding the user to change the position of the game machine to the reference position.

Further, according to an aspect of the present invention, the reference position data is data in which the situation of the game, the reference position of the game device, and the game operation carried out by the user are associated with one another, and the game processing restriction means restricts, based on the determination result by the position determination means, out of the game operations detected by the game operation detection means, the execution of the game processing corresponding to the game operation associated with a current situation of the game being executed and the reference position.

Further, according to an aspect of the present invention, the game device further includes means for executing display control for a game screen so that an orientation of the game screen displayed on the display means is directed to an orientation corresponding to the reference position associated with a current situation of the game being executed.

DESCRIPTION OF EMBODIMENTS

1. First Embodiment

A detailed description is now given of an example of an embodiment of the present invention with reference to the drawings. A game device according to the embodiment of the present invention is implemented in, for example, a portable game device, an arcade game device, a cellular phone, a personal digital assistant (PDA), or a personal computer. A description is given here of a case where the game device according to the embodiment of the present invention is implemented in a portable game device.

(1-1. Hardware Configuration of Game Device)

Figure 1:
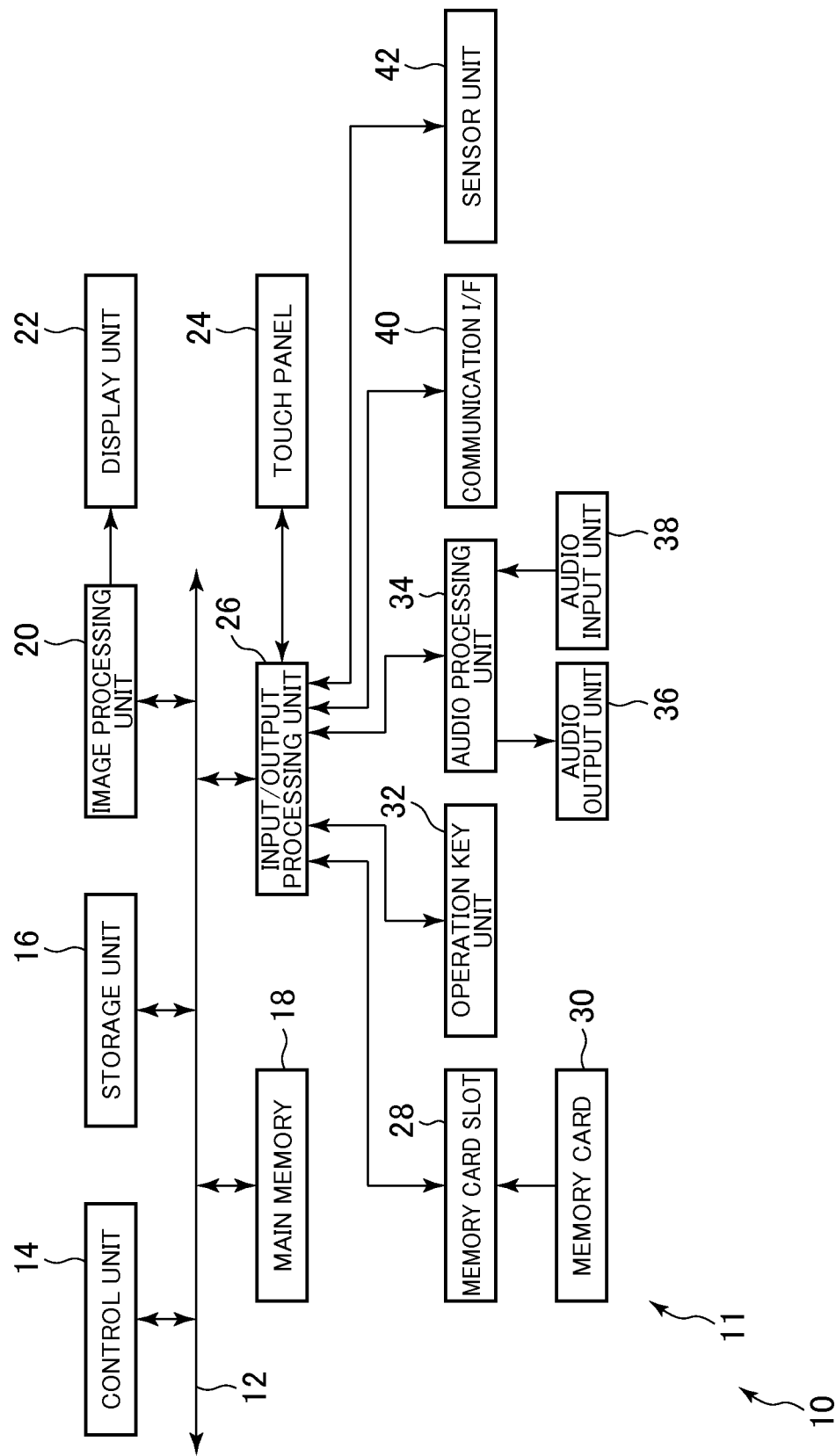
FIG. 1 A diagram illustrating a hardware configuration of a game device according to an embodiment of the present invention.

FIG. 1 is a diagram illustrating a hardware configuration of the game device according to the embodiment of the present invention. As illustrated in FIG. 1, a game device 10 includes a portable game device 11. The portable game device 11 includes a control unit 14, a storage unit 16, a main memory 18, an image processing unit 20, a display unit 22, a touch panel 24, an input/output processing unit 26, a memory card slot 28, an operation key unit 32, an audio processing unit 34, an audio output unit 36, an audio input unit 38, a communication interface (I/F) 40, a sensor unit 42, and the like.

The control unit 14 controls the components of the game device 10 based on an operating system which is stored in the storage unit 16, and on a program and various kinds of data which are stored in a memory card 30.

The storage unit 16 includes a non-volatile storage medium such as a flash memory. The storage unit 16 stores the operating system and the like.

The main memory 18 includes, for example, a RAM. A program stored in the storage unit 16 and the program read out of the game memory card 30 via the memory card slot 28 are written into the main memory 18 as the need arises. The main memory 18 is also used as a work memory of the control unit 14.

A bus 12 is used to exchange addresses and various kinds of data between the components of the game device 10. The control unit 14, the storage unit 16, the main memory 18, the image processing unit 20, and the input/output processing unit 26 are connected to one another by the bus 12 in a manner that allows those components to communicate data between one another.

The image processing unit 20 includes a VRAM. The image processing unit 20 renders an image in the VRAM in accordance with an instruction from the control unit 14. The image rendered in the VRAM is displayed on the display unit 22 at a predetermined timing. The display unit 22 is, for example, one or a plurality of known liquid crystal display panels. The liquid crystal display panel has, for example, a given aspect ratio (for example, 16:9). For example, the touch panel 24 is provided so as to overlap the display unit 22.

The touch panel 24 functions as input means with which the user performs operations. The touch panel 24 supplies the control unit 14 via the input/output processing unit 26 with contact position information corresponding to a position of a touch (depression) by the user or an object (such as a touch pen) held by the user.

The input/output processing unit 26 is an interface by which the control unit 14 exchanges various kinds of data with the touch panel 24, the memory card slot 28, the operation key unit 32, the audio processing unit 34, and the communication I/F 40.

The memory card slot 28 reads a game program and game data stored in the memory card 30 in accordance with an instruction issued from the control unit 14. The memory card 30 includes, for example, a non-volatile storage medium in which the game data such as save data is stored.

In this embodiment, the description is given of a case where the program and the data stored in the memory card 30 are used to execute a game, but any information storage medium other than the memory card 30 may be used. In addition, the program and the data may be supplied to the game device 10 from a remote site via a data communication network such as the Internet.

The operation key unit 32 functions as input means with which the user performs various kinds of operations. The operation key unit 32 includes a cross-shaped button, a slide pad, various kinds of buttons, and the like. The input/output processing unit 26 scans the state of each part of the operation key unit 32 every predetermined cycle (e.g., every $\frac{1}{60}^{th}$ of a second). An operation signal representing the scanning result is supplied to the control unit 14 via the bus 12. The control unit 14 determines a content of the user's operation based on the operation signal.

The audio processing unit 34 includes a sound buffer. The audio processing unit 34 outputs a music piece or a sound from the audio output unit 36 based on data for outputting the music piece or audio data, which is stored in the sound buffer.

The audio input unit 38 includes a microphone or the like. The audio input unit 38 detects a user's voice or the like, and inputs a detection signal to the control unit 14 via the input/output processing unit 26. The communication I/F 40 is an interface for connecting the game device 10 to the communication network.

The sensor unit 42 includes a gyro sensor for detecting an angular velocity, an acceleration sensor for detecting an acceleration, and the like. The sensor unit 42 detects a position of the display unit 22. In this embodiment, a description is given of a case where the display unit 22 is integrated with a housing of the game device 10. In other words, when the user changes the position of the game device 10, the position of the display unit 22 changes accordingly.

Note that the configuration of the game device 10 is not limited to the above-mentioned example. The game device 10 may include other components. For example, a GPS sensor, a CCD camera, and the like may also be included in the game device 10.

(1-2. Games Executed on Game Device)

A description is now given of games executed on the game device 10. The game device 10 executes a game in which a user carries out game operations to a music piece. A description is given below of, as an example, a case of execution of a game in which the user touches given positions on the touch panel 24 in time with the music piece.

When the user starts the game, the user selects any of a plurality of music pieces prepared in advance. Then, the selected music piece is reproduced. A music piece which the user can select is, for example, a music piece including parts of a plurality of musical instruments (such as a lead guitar, a bass guitar, and drums). In this embodiment, a description is given of a case where reference times at which a game operation should be carried out are defined for each of the parts. The user tries to carry out the game operation at a time coincident with the reference time.

Figure 2:
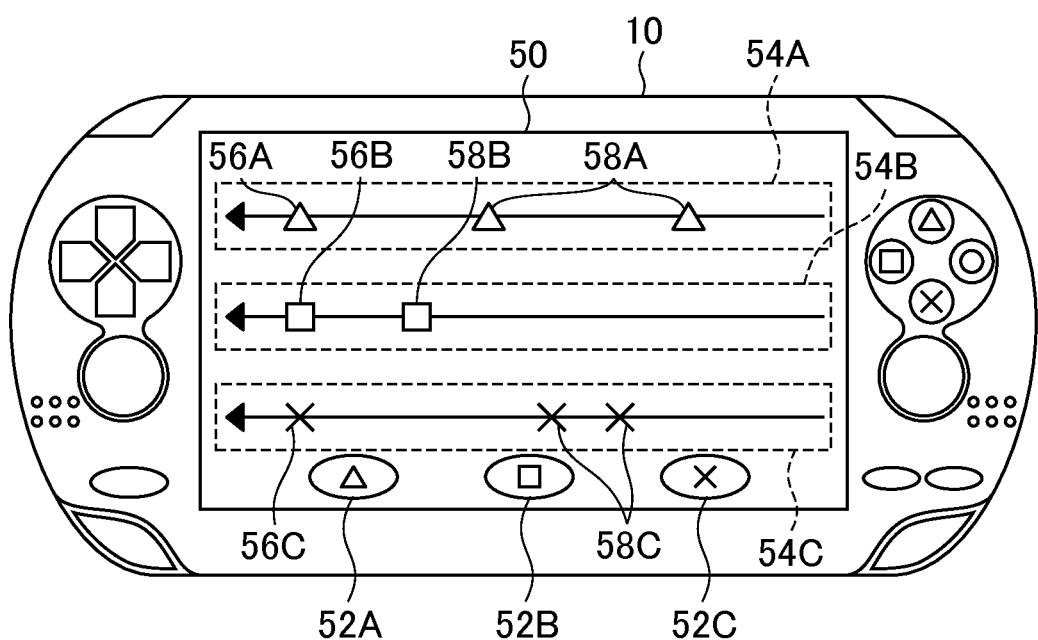
FIG. 2 A diagram illustrating an example of a game screen displayed on a display unit of the game device.

FIG. 2 is a diagram illustrating an example of the game screen displayed on the display unit 22 of the game device 10. Note that the game screen 50 of the display unit 22 is rectangular. As illustrated in FIG. 2, a position in which the display unit 22 viewed from the user is long in the horizontal direction is referred to as "horizontal position". Moreover, for example, as illustrated in FIG. 2, an orientation of the game screen 50 when the display unit 22 is in the horizontal position is referred to as "horizontal state". For example, when the display unit 22 is in the horizontal position, the user carries out the game operations in such a manner that the user plays the part of the bass guitar. For example, reference time data used for the case where the display unit 22 is in the horizontal position is produced based on a rhythm of the part of the bass guitar.

As illustrated in FIG. 2, in the game screen 50 in the horizontal state, a lower area viewed from the user displays buttons 52A, 52B, and 52C (these buttons are hereinafter generally and simply also referred to as buttons 52). The touch panel 24 is provided so as to overlap the display 22, and, for example, an action of the user touching the buttons 52 corresponds to the "game operation". In other words, when the display unit 22 is in the horizontal position, the user carries out three types of game operation.

Guidance areas 54A, 54B, and 54C (these areas are hereinafter generally and simply also referred to as guidance areas 54) respectively corresponding to the buttons 52A, 52B, and 52C are set on the game screen 50. The guidance area 54 is a display area set to guide the user regarding reference times when the button 52 is to be touched.

Reference marks 56A, 56B, and 56C (these marks are hereinafter generally and simply also referred to as reference marks 56) are displayed in a left side area of the guidance areas 54. Moreover, for example, reference time guidance marks 58A, 58B, and 58C (these marks are hereinafter generally and simply also referred to as reference time guidance marks 58) are displayed on the right side of the reference marks 56.

The reference time guidance marks 58 are guidance images for guiding the user regarding the reference time. The reference time guidance marks 58 are displayed in the guidance area 54. The reference time guidance marks 58 gradually move from the right to the left on the guidance area 54 as the time elapses. In other words, the reference time guidance marks 58 approach the reference marks 56.

When a time (reference time) when the button 52A is to be touched arrives, the reference time guidance mark 58A moving on the guidance area 54A reaches the reference mark 56A, and overlaps the reference mark 56A. When a time (reference time) when the button 52B is to be touched arrives, the reference time guidance mark 58B moving on the guidance area 54B reaches the reference mark 56B, and overlaps the reference mark 56B. When a time (reference time) when the button 52C is to be touched arrives, the reference time guidance mark 58C moving on the guidance area 54C reaches the reference mark 56C, and overlaps the reference mark 56C.

For example, when the reference times corresponding to the buttons 52A, 52B, and 52C arrive, the user can acquire a high evaluation by touching the buttons 52A, 52B, and 52C. Note that it is not necessarily the case that the user cannot acquire an evaluation unless the user touches the buttons 52A, 52B, and 52C at times completely matching the reference times, and an evaluation is given depending on a degree of matching. For example, a score increases or decreases according to an evaluation acquired by the user.

In this way, the user can recognize a time to touch the button 52 by relying on the reference time guidance mark 58 moving on the guidance area 54 and gradually approaching the reference mark 56.

In the game device 10 according to this embodiment, when the user changes the position of the display unit 22 at an arbitrary time during the game play, a part of a music piece for which the user should carry out the game operation is changed. For example, when the part of the music piece is changed, the reference times are also changed. Moreover, for example, when the part of the music piece is changed, the number of the buttons 52, the number of the guidance areas 54, and the number of the reference marks 56 are also changed. In other words, for example, when the position of the display unit 22 is changed, the number of types of game operation which the user should carry out is also changed.

Figure 3:
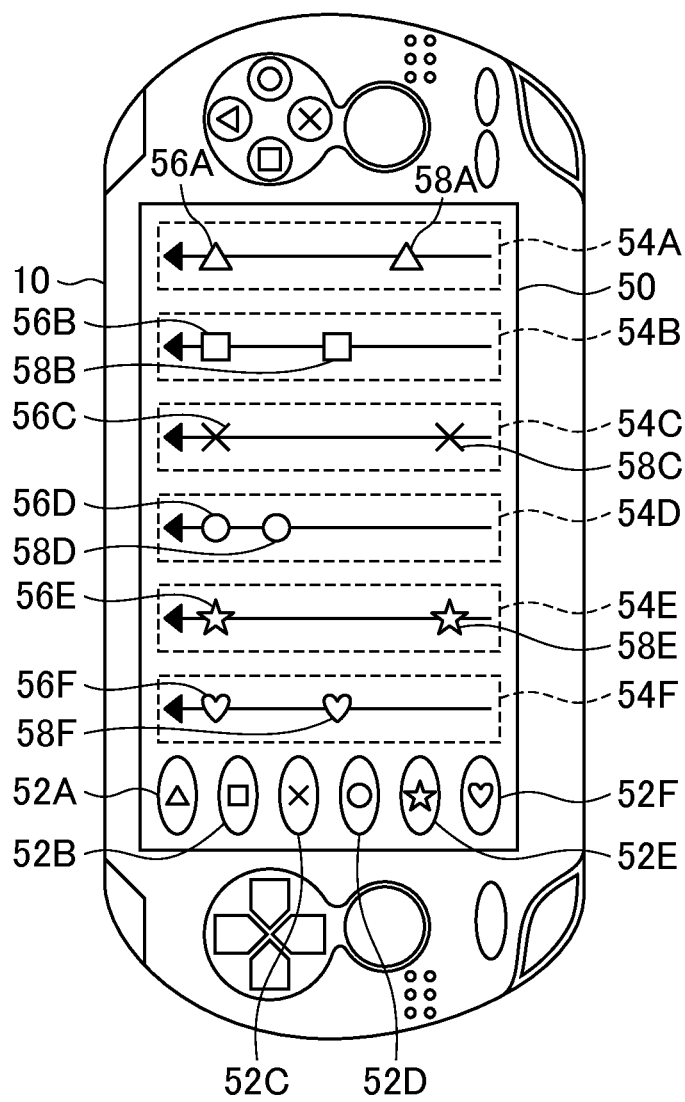
FIG. 3 A diagram illustrating an example of the game screen when a user changes a position of the display unit.

FIG. 3 is a diagram illustrating an example of the game screen 50 when the user changes the position of the display unit 22. Note that in this embodiment, as illustrated in FIG. 3, a position in which the display unit 22 viewed from the user is long in the vertical direction is referred to as "vertical position". Moreover, as illustrated in FIG. 3, for example, an orientation of the game screen 50 when the display unit 22 is in the vertical position is referred to as "vertical state".

For example, when the display unit 22 is in the vertical position, the user carries out the game operations in such a manner that the user plays the part of the lead guitar. For example, reference time data used for the case where the display unit 22 is in the vertical position is produced based on a rhythm of the part of the lead guitar.

As illustrated in FIG. 3, when the part of the music piece for which the user should carry out the game operation is changed, the number of the buttons 52 increases from three to six. In other words, the number of types of game operation which the user should carry out increases from three to six. These increased buttons 52 are referred to as buttons 52D, 52E, and 52F. Then, the display positions of the buttons 52 are changed so that the buttons 52 are arranged on a lower side (shorter side of the display unit 22) viewed from the user on the game screen 50 in the vertical state.

Moreover, according to this embodiment, the game operations and the guidance areas 54 correspond to each other, and in order to match the buttons 52, the number of which has increased from three to six, the number of the guidance areas 54 increases from three to six. These increased guidance areas 54 are referred to as guidance areas 54D, 54E, and 54F.

The button 52D corresponds to the guidance area 54D. As a reference time at which the user should touch the button 52D approaches, a reference time guidance mark 58D approaches a reference mark 56D. The button 52E corresponds to the guidance area 54E. As a reference time at which the user should touch the button 52E approaches, a reference time guidance mark 58E approaches a reference mark 56E. The button 52F corresponds to the guidance area 54F. As a reference time at which the user should touch the button 52F approaches, a reference time guidance mark 58F approaches a reference mark 56F.

As described above, when the user changes the position of the display unit 22 from the horizontal position to the vertical position, the part of the music piece for which the user should carry out the game operation is changed. For example, when the display unit 22 is in the horizontal position, the user carries out the three types of game operation corresponding to the part of the bass guitar, and when the display unit 22 is brought into the vertical position, the user has to carry out the six types of game operation corresponding to the part of the lead guitar. Thus, when the display unit 22 is in the vertical position, a degree of difficulty of the game becomes higher than that in the case where the display unit 22 is in the horizontal position, but the user carries out a large number of game operations, and can gain more chances to acquire points. A detailed description is now given of this technology.

(1-3. Functions Realized in Game Device)

Figure 4:
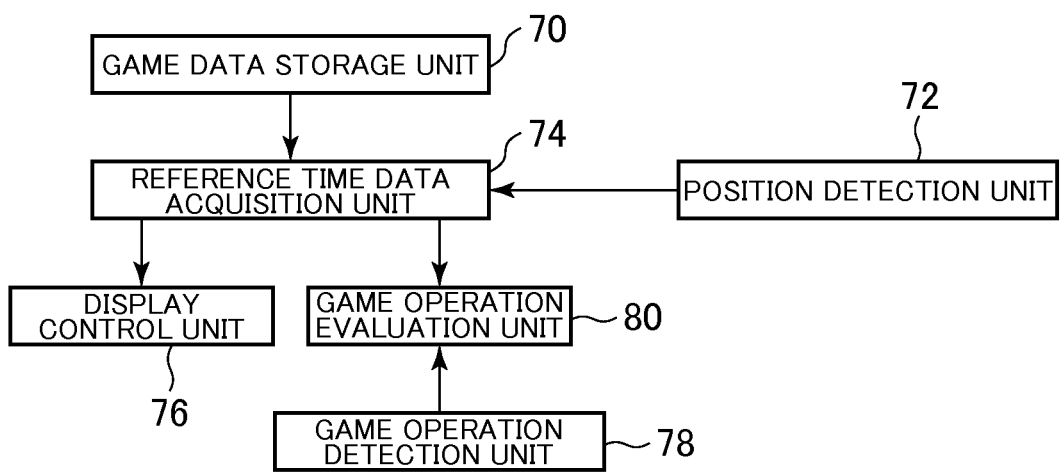
FIG. 4 A functional block diagram illustrating functions realized in the game device.

FIG. 4 is a functional block diagram illustrating functions realized in the game device 10. As illustrated in FIG. 4, the game device 10 includes a game data storage unit 70, a position detection unit 72, a reference time data acquisition unit 74, a display control unit 76, a game operation detection unit 78, and a game operation evaluation unit 80. These functions are realized by the control unit 14 executing a game program stored in the memory card 30.

(1-3-1. Game Data Storage Unit)

The game data storage unit 70 is realized mainly by the main memory 18 and the memory card 30. The game data storage unit 70 stores data required for executing a game. For example, the game data storage unit 70 stores data of a plurality of music pieces.

(Music Piece Data)

Figure 5:
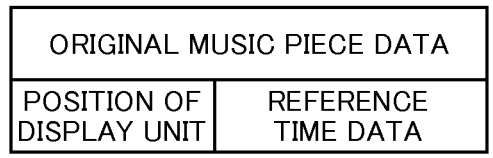
FIG. 5 A diagram illustrating an example of music piece data corresponding to one music piece.

FIG. 5 is a diagram illustrating an example of the music piece data corresponding to one music piece. The music piece data illustrated in FIG. 5 contains original music piece data, and the reference time data associated with the position of the display unit 22. The original music piece data is, for example, general popular music and the like stored in a predetermined data format.

The reference time data is data representing reference times at which the user should carry out a game operation. The reference time data is associated with the position of the display unit 22. For example, the reference time data is stored for each position of the display unit 22 detected by the position detection unit 72. According to this embodiment, the display unit 22 takes the horizontal position and the vertical position, and hence the reference time data for the horizontal position and the reference time data for the vertical position are contained in the music piece data.

Figure 6:
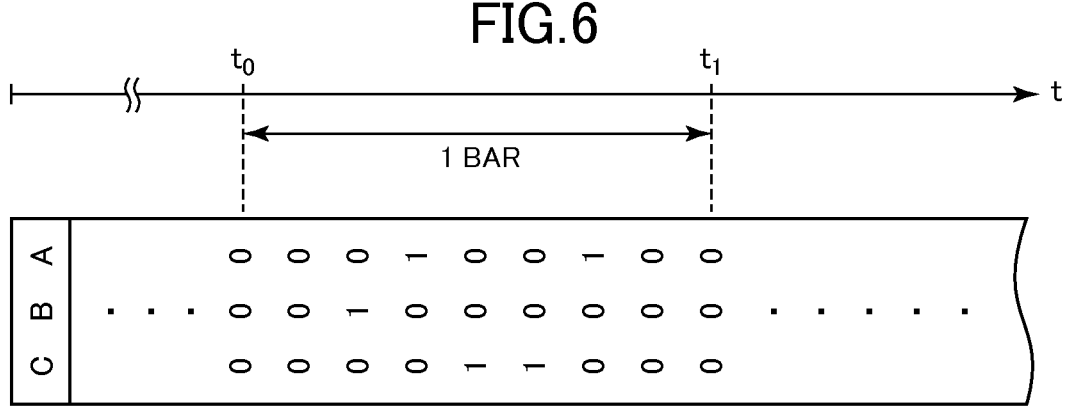
FIG. 6 A diagram illustrating a data storage example of reference time data for a horizontal position.

FIG. 6 is a diagram illustrating a data storage example of the reference time data for the horizontal position. A "t axis" illustrated in FIG. 6 is a time axis. The t axis represents elapsed time after the reproduction of the music piece starts. For example, the reference time data represents, in units of $1/256^{th}$ of a bar, a reference time at which the user should carry out the game operation. Note that for the sake of simple description, FIG. 6 illustrates data obtained by dividing one bar into eight parts. In other words, FIG. 6 illustrates, in units of $1/8^{th}$ of a bar, times at which the user should carry out the game operation.

As illustrated in FIG. 6, at each time point of $1/8$ bar, whether or not the user should carry out a game operation is specified. The reference time data for the horizontal position is, for example, data representing reference times for the part of the bass guitar, and defines reference times at which the user should carry out the three types of game operation of touching the buttons 52A, 52B, and 52C.

Whether or not the buttons 52A, 52B, and 52C should be touched is represented by, for example, three-bit data at each time point in the $1/8^{th}$ of a bar. In FIG. 6, a bit represented by "A" corresponds to the button 52A. "0" represents that the button 52A should not be touched. On the other hand, "1" represents that the button 52A should be touched.

Similarly, bits of "B" and "C" respectively correspond to the buttons 52B and 52C. In other words, it is considered that data including three bits at least one of which is "1" is data representing a reference time.

Figure 7:
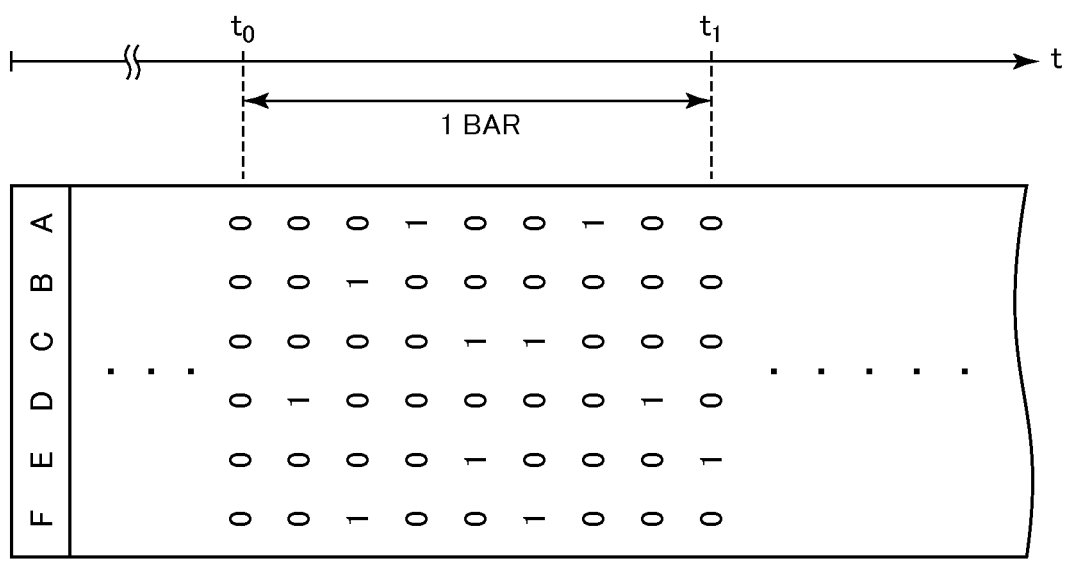
FIG. 7 A diagram illustrating a data storage example of the reference time data for a vertical position.

FIG. 7 is a diagram illustrating a data storage example of the reference time data for the vertical position. A "t axis" illustrated in FIG. 7 is similar to the t axis in FIG. 6. In other words, the reference time data represents times when the buttons 52A, 52B, 52C, 52D, 52E, and 52F should be touched in units of $1/256^{th}$ of a bar, and for the sake of simple description, data in which the one bar is divided into eight parts is described here. The reference time data for the vertical position is, for example, data representing reference times for the part of the lead guitar, and defines reference times at which the user should carry out the six types of game operation for touching the buttons 52A, 52B, 52C, 52D, 52E, and 52F.

The reference time data for the vertical position is represented by six bits. The bits for "A", "B", and "C" are the same as the reference time data in the horizontal position, and a description thereof is therefore omitted. Bits for "D", "E", and "F" respectively correspond to the buttons 52D, 52E, and 52F. In other words, it is considered that data including six bits, at least one of which is "1", is data representing a reference time.

As described above, according to this embodiment, the reference time data represents reference times at which the user should carry out each of the one or plurality of types of game operation.

For example, the position of the display unit 22 may be at least a first position (such as the horizontal position) and a second position (such as the vertical position) in the game device 10. The reference time data associated with the first position (such as the horizontal position) is data representing reference times at which the user should carry out each of the game operations of m (m: integer equal to or more than 1, m=3 in the example in FIG. 6) types. For example, the reference time data associated with the first position (such as the horizontal position) is reference time data corresponding to parts of one or a plurality of first musical instruments (such as the bass guitar) out of a plurality of musical instruments.

The reference time data associated with the second position (such as the vertical position) is data representing reference times at which the user should carry out each of the game operations of n (n: integer equal to or more than 1, n=6 in the example in FIG. 7) types. n may have the same value as m or a different value. For example, the reference time data associated with the second position (such as the vertical position) is reference time data corresponding to parts of one or a plurality of second musical instruments (such as the lead guitar) out of a plurality of musical instruments.

For example, the number of types of game operation is represented by a bit string stored in the reference time data. For example, the reference time data for the horizontal position represented by three bits represents that the number of types of game operation which the user should carry out is three. On the other hand, for example, the reference time data for the vertical position represented by six bits represents that the number of types of game operation which the user should carry out is six.

(Guidance Subject Period Data)

Moreover, in this embodiment, a description is given of a case where the game data storage unit 70 stores guidance subject period data in which the position of display means (such as the display unit 22) and a guidance subject period which is a period for providing guidance regarding the reference time are associated with each other.

Figures 8, 9:
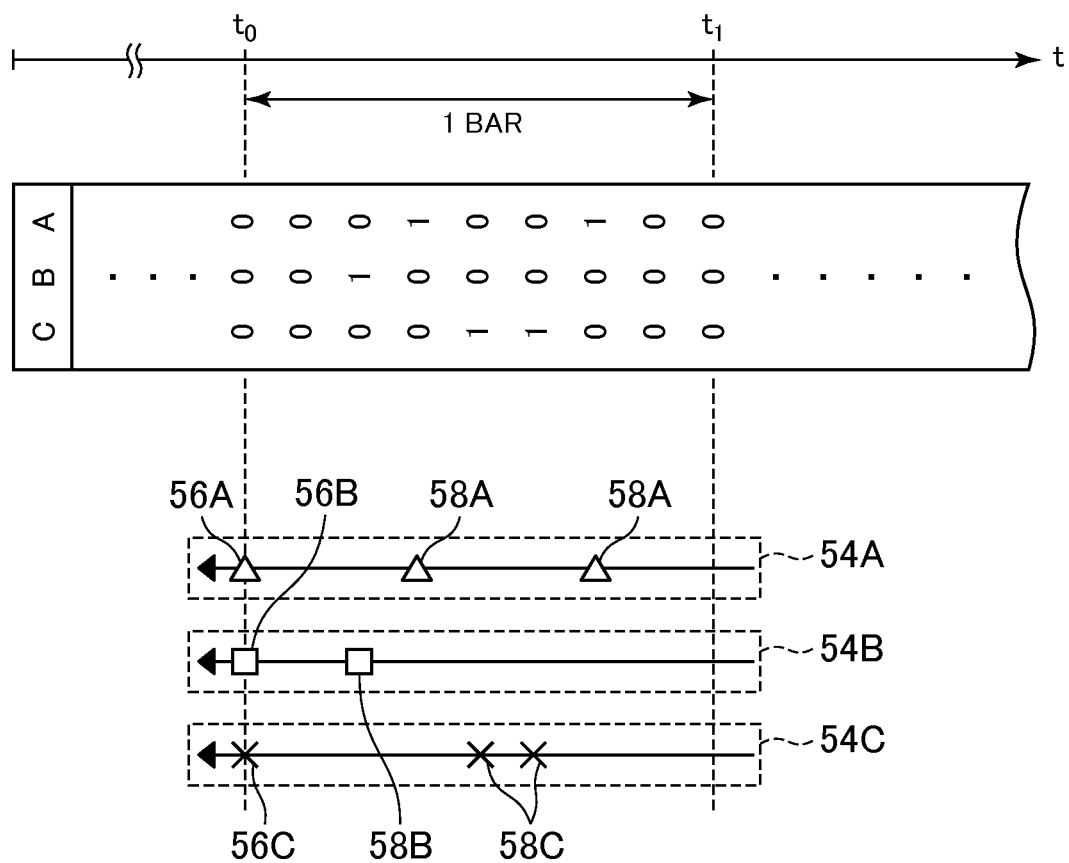
FIG. 8 A table illustrating a data storage example of guidance subject period data.
FIG. 9 A diagram for illustrating display processing for a game screen when the display unit is in the horizontal position.

FIG. 8 is a table illustrating an example of a data storage example for the guidance subject period data. The guidance subject period is a period for providing guidance regarding the reference time on the game screen 50, and is, for example, a predetermined period after the current time point. For example, when the display unit 22 is in the horizontal position, guidance for the reference times from the current time point to a time point after 1 bar is provided. Moreover, for example, when the display unit 22 is in the vertical position, guidance for the reference times from the current time point to a time point after $1/2$ a bar is provided.

(Other Data)

Moreover, the game data storage unit 70 stores, in addition to the above-mentioned data, game situation data representing a situation of a game being executed. In the game situation data, for example, an elapsed time after reproduction of a music piece started, and a score data representing a score of the user, are stored.

The score data changes in value based on an evaluation made for the user. For example, when the user acquires a high evaluation, a value of the score data increases. On the other hand, when the user acquires a low evaluation, a value of the score data decreases.

Note that the control unit 14 functions as means for acquiring various kinds of data to be stored in the game data storage unit 70. Moreover, the control unit 14 functions as means for changing (updating) the various kinds of data stored in the game data storage unit 70. Moreover, data stored in the game data storage unit 70 is not limited to the above-mentioned example as long as data required by the game device 10 executing a game is stored. In addition, for example, image data for the horizontal position and image data for the vertical position may be stored.

(1-3-2. Position Detection Unit)

The position detection unit 72 is realized mainly by the control unit 14 and the sensor unit 42. The position detection unit 72 detects the position of the display means (such as the display unit 22). The position detection unit 72 detects the position of the display unit 22 based on a detection signal of the sensor unit 42. According to this embodiment, the position detection unit 72 detects at least the first position (such as the horizontal position) and the second position (such as the vertical position) of the display unit 22.

Note that various publicly known methods can be applied to the method of detecting the position of the display unit 22 based on the detection signal of a gyro sensor, an acceleration sensor, or the like. For example, when the game device 10 includes a CCD camera (photographing means), the position of the display unit 22 may be acquired based on a change in the images successively photographed by the CCD camera.

(1-3-3. Reference Time Data Acquisition Unit)

The reference time data acquisition unit 74 is realized mainly by the control unit 14. The reference time data acquisition unit 74 acquires, from means (such as the game data storage unit 70) for storing the position of the display means (such as the display unit 22) and the reference time data representing the reference times when the user should carry out the game operation in association with each other, the reference time data associated with the position of the display means detected by the position detection unit 72. For example, the reference time data acquisition unit 74 acquires the reference time data for the first position (such as the horizontal position) and the reference time data for the second position (such as the vertical position).

In this embodiment, a description is given of a case where, from the means (such as the game data storage unit 70) for storing the position of the display means (such as the display unit 22) and the reference time data corresponding to any one of parts of a plurality of musical instruments in association with each other, the reference time data corresponding to any one of the parts of the plurality of musical instruments associated with the position of the display means detected by the position detection unit 72 is acquired.

(1-3-4. Display Control Unit)

The display control unit 76 is realized mainly by the control unit 14. Based on the reference time data associated with the position of the display means (such as the display unit 22) detected by the position detection unit 72, the display control unit 76 controls the display means to display guidance images (such as the reference time guidance marks 58) providing guidance for the reference times.

For example, when the position of the display unit 22 is in the first position (such as the horizontal position), the display control unit 76, based on the reference time data associated with the first position, controls the display unit 22 to display guidance images (such as reference time guidance marks 58) for guiding the user regarding the reference times to carry out each of the m types of game operation. Moreover, for example, when the position of the display unit 22 is in the second position (such as the vertical position), the display control unit 76, based on the reference time data associated with the second position, controls the display unit 22 to display guidance images (such as reference time guidance marks 58) for guiding the user regarding the reference times to carry out each of the n types of game operation.

According to this embodiment, by setting the guidance areas 54 corresponding to the number of types of game operation represented by the reference time data associated with the position of the display means (such as the display unit 22) detected by the position detection unit 72 in the game screen 50 to be displayed on the display means, and providing control to display the guidance images (such as reference time guidance marks 58) on the set guidance areas 54, the guidance for each of one or a plurality of types of game operation is provided for the user.

For example, the display control unit 76 guides the user in the each of one or the plurality of types of game operation, by moving each of the guidance images (such as the reference time guidance marks 58) toward a target position so that the distance between the guidance image and the target position corresponds to a remaining time until the reference time arrives, in each of the guidance areas 54. The target position is a position set in the guidance area 54, and is a position of a destination of the travel of the reference time guidance mark 58. For example, the target position is the display position of the reference mark 56.

For example, when the position of the display unit 22 is in the first position (such as the horizontal position), the display control unit 76 guides the user for each of the m types of game operation, in each of the m guidance areas 54 set on the game screen 50 displayed on the display unit 22, by moving the guidance images (such as the reference time guidance marks 58) toward the target positions. Moreover, for example, when the position of the display unit 22 is in the second position (such as the vertical position), the display control unit 76 guides the user for each of the n types of game operation, in each of the n guidance areas 54 set on the game screen 50 displayed on the display unit 22, by moving the guidance images (such as the reference time guidance marks 58) toward the target position.

Moreover, in this embodiment, a description is given of the case where the display control unit 76 controls the display means to display guidance images (such as the reference time guidance marks 58) providing guidance for the reference times in the guidance subject period associated with the position of the display means (such as the display unit 22) detected by the position detection unit 72.

For example, when the position of the display unit 22 is in the first position (such as the horizontal position), the display control unit 76 displays guidance images (such as reference time guidance marks 58) for providing guidance for the reference times of each of the m types of game operation arriving after the current time point in the guidance subject period associated with the first position. Moreover, for example, when the position of the display unit 22 is in the second position (such as the vertical position), the display control unit 76 displays guidance images (such as reference time guidance marks 58) for providing guidance for the reference times of each of the n types of game operation arriving after the current time point in the guidance subject period associated with the second position.

First, a specific description is given of a display method of the game screen 50 in the horizontal state when the display unit 22 is in the horizontal position.

FIG. 9 is a diagram for illustrating display processing for the game screen 50 when the display unit 22 is in the horizontal position. While a music piece is being reproduced, data for the guidance subject period is read out from the reference time data. For example, the guidance subject period varies depending on the position of the display unit 22. Here, a description is given of a case where the guidance subject period for the horizontal position of the display unit 22 is a period of one bar from the current time point. For example, when the current time point is a time $t_0$, the reference time data in one bar from the time $t_0$ is read out.

For example, based on the above-mentioned read reference time data, the guidance images (such as reference time guidance marks 58) guiding the user for the reference times after the current time point are displayed on the game screen 50. When the display unit 22 is in the horizontal position and the number of game operations which the user should carry out ism (in this example, m=3), m guidance areas 54 are set on the game screen 50. For example, the m guidance areas 54 are areas respectively extending parallel with one another from a first end (for example, one end of a longer side or a shorter side) of the display unit 22 toward a second end (for example, the other end of the longer side or the shorter side) opposite to the first end.

In this embodiment, a description is given of a case where the display control unit 76 sets the guidance areas 54 parallel with one another on the screen (such as the game screen 50) of the display means, and moves each of the guidance images (such as the reference time guidance marks 58) toward the reference position (such as the display position of the reference mark 56) so that a time difference between the current time point and the reference time corresponds to a difference between the display position of the guidance image and the reference position in the guidance area 54.

In other words, the reference time guidance marks 58 move so as to move on the three guidance areas 54 set parallel with one another on the game screen 50. For example, in the guidance areas 54 on the game screen 50, the reference time guidance marks 58 gradually move toward the display positions (reference positions) of the reference marks 56.

The display position of the reference time guidance mark 58 is adjusted so that the distance between the reference time guidance mark 58 and the reference mark 56 is a distance corresponding to a time until the reference time arrives. For example, as the time until the arrival of the reference time at which the user should touch the button 52A decreases, the distance from the reference time guidance mark 58A to the reference mark 56A decreases.

On the other hand, when the display unit 22 is in the vertical position, for example, six guidance areas 54 are set parallel with one another on the game screen 50 in the vertical state.

Figure 10:
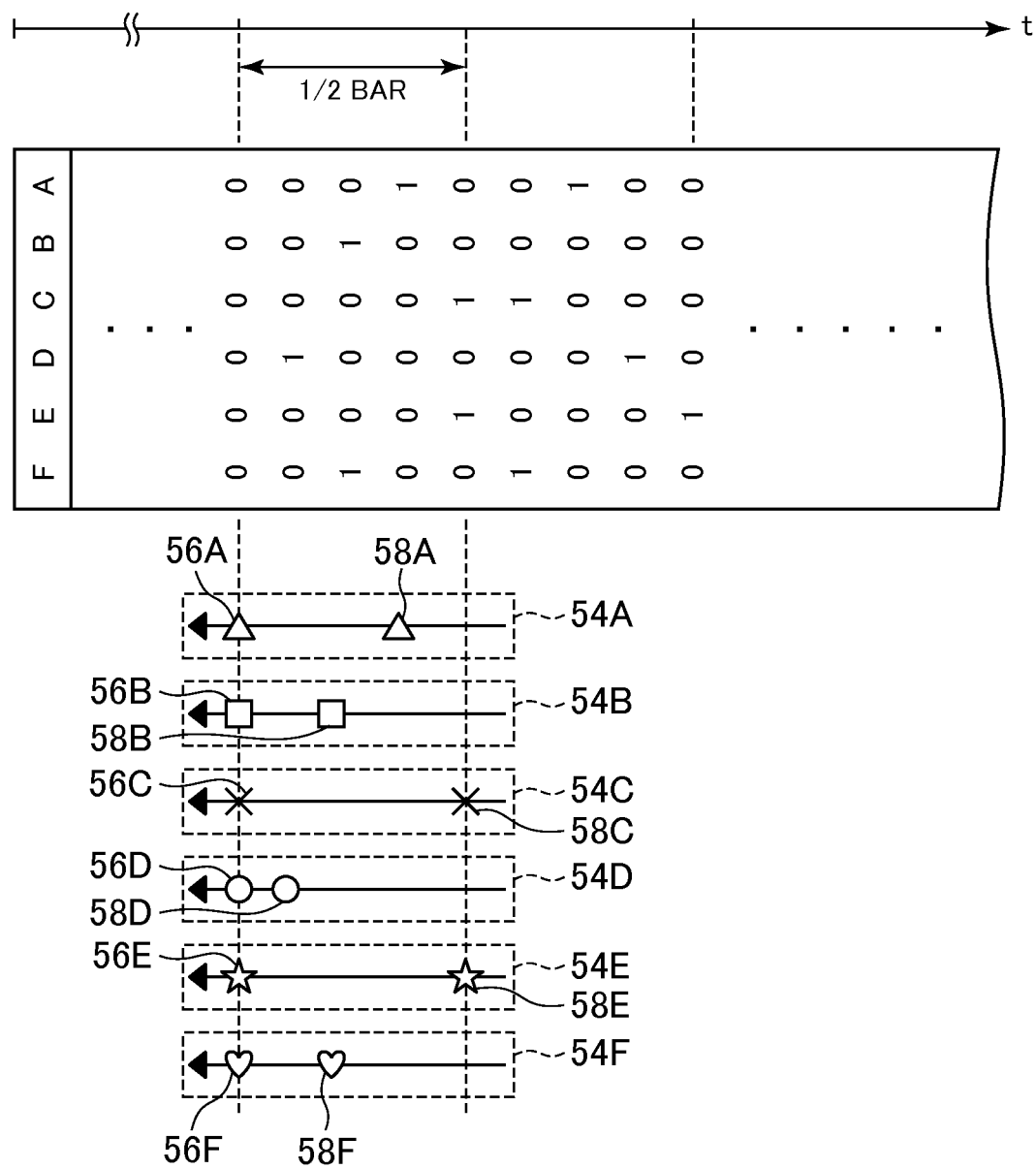
FIG. 10 A diagram for illustrating the display processing for the game screen when the display unit is in the vertical position.

FIG. 10 is a diagram for illustrating display processing for the game screen 50 when the display unit 22 is in the vertical position. According to this embodiment, when the display unit 22 is in the vertical position, the guidance subject period is a period corresponding to ½ a bar, which is shorter than the guidance subject period for the case where the display unit 22 is in the horizontal position. For example, when the current time point is a time $t_0$, the reference time data in the ½ a bar from the time $t_0$ is read out.

When the display unit 22 is in the vertical position and the number of game operations which the user should carry out is n (in this example, n=6), n guidance areas 54 are set on the game screen 50. The n guidance areas 54 are areas respectively extending parallel with one another from a third end (for example, one end of the longer side or the shorter side, which is different from the first end) of the display unit 22 toward a fourth end (for example, the other end of the longer side or the shorter side, which is different from the first end) opposite to the third end.

Moreover, the number of the guidance areas 54 represented by the reference time data for the vertical position is six, and hence the six guidance areas 54 are set parallel with one another. The reference time guidance marks 58 move so as to move on these six guidance areas 54. A control method for the display positions of the reference time guidance marks 58 is the same as that in the case of the horizontal position.

(1-3-5. Game Operation Detection Unit)

The game operation detection unit 78 is realized mainly by the control unit 14 and the touch panel 24. The game operation detection unit 78 detects a game operation carried out by the user. The game operation detection unit 78 detects the game operation based on an operation content on operation means (such as the touch panel 24) by the user. According to this embodiment, for example, the game operation detection unit 78 detects a game operation by determining whether or not the button 52 is touched by the user based on an operation signal supplied from the touch panel 24.

(1-3-6. Game Operation Evaluation Unit)

The game operation evaluation unit 80 is realized mainly by the control unit 14. The game operation evaluation unit 80 evaluates a game operation carried out by the user, based on the reference time data associated with the position of the display means (such as the display unit 22) detected by the position detection unit 72 and the detection result by the game operation detection unit 78.

For example, the game operation evaluation unit 80 evaluates a game operation based on a deviation between the reference time represented by the reference time data and a time (hereinafter referred to as "operation time") when the user actually carries out the game operation. For example, as the deviation in time between the reference time and the operation time decreases, the evaluation for the game operation increases. Depending on the evaluation, the value of the score data increases/decreases.

(1-4. Processing Executed by Game Device)

Figure 11:
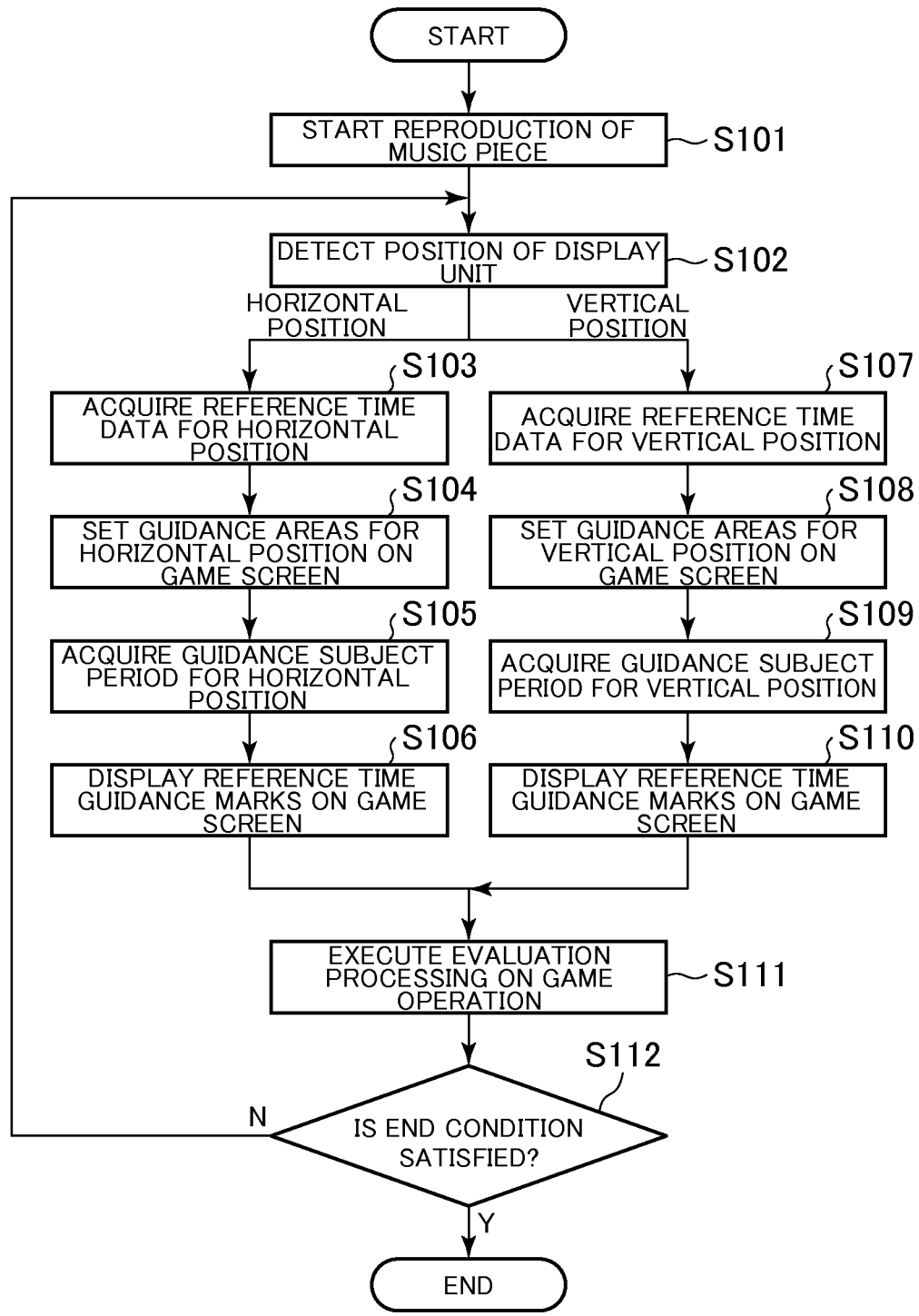
FIG. 11 A flowchart mainly illustrating processing, of the processing executed by the game device, that relates to the present invention.

Next, a description is given of processing executed by the game device 10. FIG. 11 is a flowchart mainly illustrating processing relating to the present invention out of processing executed by the game device 10. The control unit 14 executes the processing illustrated in FIG. 11 in accordance with the program stored in the memory card 30.

As illustrated in FIG. 11, first, the control unit 14 starts the reproduction of a music piece (S101). The control unit 14 detects the position of the display unit 22 (S102). According to this embodiment, whether the display unit 22 is in the vertical position or the horizontal position is detected.

When the position of the display unit 22 is in the horizontal position (horizontal position in S102), the control unit 14 acquires the reference time data for the horizontal position (S103). Based on the reference time data for the horizontal position, the control unit 14 determines the number of the guidance areas 54 to be set on the game screen 50, and sets the guidance areas 54 on the game screen 50 (S104). For example, the number of types of game operation represented by the reference time data for the horizontal position is three, and hence three guidance areas 54 corresponding to the three types of game operation are set parallel with one another.

The control unit 14 refers to the guidance subject period data, and acquires the guidance subject period for the case where the display unit 22 is in the horizontal position (S105). For example, with the horizontal position, the fact that the guidance subject period is one bar is associated.

The control unit 14 refers to the reference time data of the guidance subject period (such as one bar) in the case where the display unit 22 is in the horizontal position, and controls the game screen 50, to which the guidance areas 54 are set in S104, to display reference time guidance marks 58 (S106). In S106, based on the time difference between an elapsed time of the music piece at the current time point and the reference time, the display control for the reference time guidance marks 58 is executed.

On the other hand, when the position of the display unit 22 is in the vertical position (vertical position in S102), the control unit 14 acquires the reference time data for the vertical position (S107). The control unit 14 determines, based on the reference time data for the vertical position, the number of the guidance areas 54 to be set on the game screen 50, and sets the guidance areas 54 on the game screen 50 (S108). For example, the number of types of game operation represented by the reference time data for the vertical position is six, and six guidance areas 54 corresponding to the six types of game operation are set parallel with one another.

The control unit 14 refers to the guidance subject period data, and acquires the guidance subject period for the case where the display unit 22 is in the vertical position (S109). For example, with the vertical position, the fact that the guidance subject period is ½ a bar is associated.

The control unit 14 refers to the reference time data of the guidance subject period (such as ½ a bar) in the case where the display unit 22 is in the vertical position, and controls the game screen 50, to which the guidance areas 54 are set in S108, to display reference time guidance marks 58 (S110). In S110, based on the time difference between an elapsed time of the music piece at the current time point and the reference time, the display control for the reference time guidance marks 58 is executed.

The control unit 14 executes the evaluation processing on the game operation carried out by the user (S111). Note that the evaluation processing described below is executed based on the reference time data depending on the position of the display unit 22.

Figure 12:
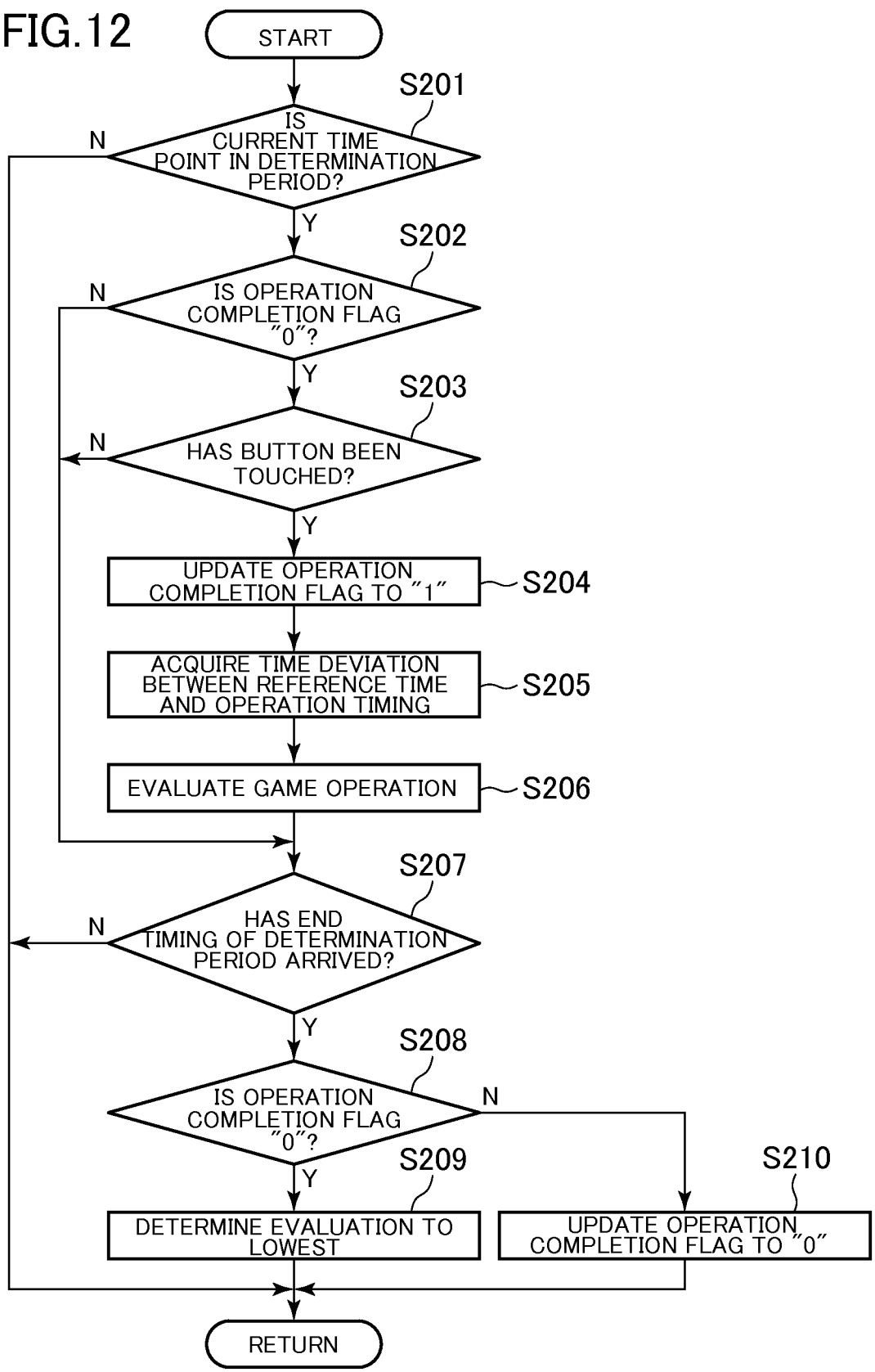
FIG. 12 A flowchart illustrating evaluation processing on a game operation carried out in S111.

FIG. 12 is a flowchart illustrating the evaluation processing on the game operation, which is executed in S111. As illustrated in FIG. 12, the control unit 14 determines whether or not the current time point is in a determination period (S201). The determination period is a period from a time point a predetermined period (first period) before the reference time to a time point a predetermined period (second period) after the reference time. The first period and the second period may be the same or different from each other.

When it is determined that the current time point is not in the determination period (N in S201), the control unit 14 finishes the processing. In other words, the control unit 14 executes the processing in S112 of FIG. 11.

On the other hand, when it is determined that the current time point is in the determination period (Y in S201), the control unit 14 determines whether or not an operation completion flag is "0" (S202). The operation completion flag is information stored in the main memory 18 or the like and represents whether or not the button 52 has been touched in the current determination period. The operation completion flag takes a value of 0 or 1. The value 0 represents that the button 52 has not been touched. On the other hand, the value 1 represents that the button 52 has been touched.

When it is determined that the operation completion flag is not "0" (N in S202), the control unit 14 does not execute processing in S203-S206 of FIG. 12, and executes processing in S207 described later.

On the other hand, when it is determined that the operation completion flag is "0" (Y in S202), the control unit 14 determines whether or not a button 52 corresponding to the reference time has been touched (S203). The button 52 corresponding to the reference time is a button 52 to be touched when the reference time arrives. The determination in S203 is carried out based on the operation signal supplied from the touch panel 24.

When it is determined that the button 52 has not been touched (N in S203), the control unit 14 does not execute processing in S204-S206 of FIG. 11, and executes the processing in S207 described later. On the other hand, when it is determined that the button 52 has been touched (Y in S203), the control unit 14 updates the operation completion flag to "1" (S204).

Further, the control unit 14 acquires the deviation time between the reference time and the operation time at which the game operation has been carried out (S205). The deviation time takes a negative value when the operation time is earlier than the reference time. On the other hand, the deviation time takes a positive value when the operation time is later than the reference time. Note that when the display unit 22 is in the horizontal position, the deviation time based on the reference time data for the horizontal position is acquired, and when the display unit 22 in the vertical position, the deviation time based on the reference time data for the vertical position is acquired.

Based on the deviation time acquired in S205, the control unit 14 carries out the evaluation of the game operation carried out by the user (S206). The evaluation of the game operation is carried out depending on, for example, whether or not the deviation time acquired in S205 is in a predetermined range in S206. Moreover, for example, based on the evaluation, the score represented by the score data stored in the main memory 18 is increased/decreased.

The control unit 14 determines whether or not an end time of the determination period has arrived (S207). When it is determined that the end time of the determination period has not arrived (N in S207), the control unit 14 finishes the processing. In other words, the control unit 14 executes the processing in S112 of FIG. 11.

On the other hand, when it is determined that the end time of the determination period has arrived (Y in S207), the control unit 14 determines whether or not the operation completion flag is "0" (S208). The case where the operation completion flag is "0" is a case where the button 52 has not been touched during the determination period.

When it is determined that the operation completion flag is "0" (Y in S208), the control unit 14 determines the evaluation to be the lowest one (S209). Then, the control unit 14 finishes the processing. In other words, the control unit 14 executes the processing in S112 of FIG. 11.

On the other hand, when it is determined that the operation completion flag is not "0" (N in S208), the control unit 14 updates the operation completion flag to "0" (S210). Then, the control unit 14 finishes the processing. In other words, the control unit 14 executes the processing in S112 of FIG. 11.

Returning to FIG. 11, the control unit 14 determines whether or not an end condition is satisfied (S112). It is only necessary for the end condition to be a condition determined in advance, and examples of the end condition include whether or not a music piece has finished and whether or not the score represented by the score data is in a predetermined range.

When it is determined that the end condition is satisfied (Y in S112), the control unit 14 finishes the processing. When it is not determined that the end condition is satisfied (N in S112), the processing returns to S102.

The above-mentioned game device 10 can use different reference time data for a game depending on the position of the display unit 22. The user can intentionally change the reference time by changing the position of the display unit 22. For example, when the user changes the position of the display unit 22, the user can switch the part of a music piece, and can then play the game.

Moreover, depending on the position of the display unit 22, the number of types of game operation which the user should carry out can be changed. The number of types of game operation corresponds to the number of the guidance areas 54 set on the game screen 50, and hence the user can change the number of guidance areas 54 depending on the position of the display unit 22. For example, when the display unit 22 is in the vertical position, the number of guidance areas 54 is more than that in the case where the display unit 22 is in the horizontal position. When the number of guidance areas 54 increases, the number of game operations which the user should carry out increases, with the result that difficulty of a game can be changed depending on the position of the display unit 22.

Moreover, the guidance subject period is determined depending on the position of the display unit 22, and, depending on the orientation of the display unit 22, as many reference time guidance marks 58 as the game screen 50 can contain can be displayed.

2. Modified Examples

Note that the present invention is not limited to the embodiment described above. Changes can be appropriately made without departing from the gist of the present invention.

(1) For example, in the embodiment, the description has been given of the case where the user changes the position of the display unit 22 at an arbitrary time, but the position of the display unit 22 may be changed depending on the situation of a game being executed. For example, when the situation of the game being executed is brought into a reference situation determined in advance, an image for guiding the user to change the position of the display unit 22 may be displayed.

For example, information representing a predetermined period in a reproduction period of a music piece and a reference position which the display unit 22 should take may be stored in association with each other. For example, during a music piece, the display unit 22 may be brought into the vertical position in a lively period, and the display unit 22 may be brought into the horizontal position in the other period. In this way, the game play can be differentiated between the lively period and the non-lively period in the music piece.

Moreover, for example, depending on whether or not a time at which the position of the display unit 22 is changed satisfies a predetermined condition, a restriction may be imposed so that a part of a musical instrument corresponding to the reference time data is not changed. The predetermined condition is, for example, a condition representing whether or not the time at which the position of the display unit 22 is changed is in a predetermined period in the reproduction period of a music piece.

For example, when the time at which the position of the display unit 22 is changed does not satisfy the predetermined condition, a restriction is imposed so that the reference time data corresponding to a part of a musical instrument associated with the position is not acquired. In other words, the display control processing for the game screen 50 and the evaluation processing on the game operation are executed by using the same reference time data used before the change in position of the display unit 22. For example, based on whether or not, at a predetermined time during the reproduction period of the music piece, the user has changed the position of the display unit 22, it is determined whether or not the part of the musical instrument is changed.

For example, when a time at which the user has changed the position of the display unit 22 is a time for a predetermined delimiter of a bar of a music piece, the part is switched. In other words, when the position of the display unit 22 is changed at a time suitable as a delimiter of the music piece, the part may be switched from the bass guitar to the lead guitar. In this case, the reference time data acquired by the reference time data acquisition unit 74 is changed from the reference time data corresponding to the bass guitar to the reference time data corresponding to the lead guitar.

On the other hand, when a time at which the user has changed the position of the display unit 22 is not the time for the predetermined delimiter of the bar of the music piece, a restriction is imposed so that the part is not switched. In other words, when the position of the display unit 22 is changed at a time not suitable as the delimiter of the music piece, the part is not switched, and remains as the part for the bass guitar. In this case, the reference time acquired by the reference time data acquisition unit 74 is not changed, and remains as the reference time data corresponding to the bass guitar.

As described above, depending on the time at which the position of the display unit 22 is changed, by restricting the change in part, for example, the user can be prevented from playing a part of another musical instrument starting from an improper time.

In addition, for example, depending on whether or not the score represented by the score data enters a predetermined range, the user may be prompted to change the position of the display unit 22. For example, when the score represented by the score data is brought into the predetermined range, and the user is close to over the end of the game, the user may be prompted to bring the display unit 22 into the horizontal position, thereby decreasing the difficulty. Moreover, for example, in a situation in which the score represented by the score data is not within the predetermined range and the possibility of the user reaching the end of the game is low, the user may be prompted to bring the display unit 22 into the vertical position, thereby increasing the difficulty.

(2) Moreover, the description has been given of the case, as an example, where the display unit 22 takes the horizontal position and the vertical position, but the position of the display unit 22 associated with the reference time data only needs to be a position of the display unit 22 which can be detected by the sensor unit 42. In addition, for example, a position acquired by rotating the horizontal position illustrated in FIG. 2 by 180 degrees (that is, position in which the user holds the game device 10 upside down) may be associated with reference time data.

(3) Moreover, for example, the description has been given of the case where the game operation is the touch on the button 52 by the user, but the game operation is not limited to this case. In addition, for example, depression of the operation key unit 32 may be the game operation, and various publicly-known operations can be applied as the game operation.

(4) Moreover, for example, the display contents of the game screen 50 are not limited to the example of the embodiment. The game screen 50 only needs to display a guidance image for providing guidance for reference times corresponding to the position of the display unit 22. In addition, for example, a guidance image for providing guidance in the reference time may change to a predetermined size as the reference time approaches, thereby providing guidance for the reference time.

(5) Moreover, for example, the description has been given of the case where the guidance subject period changes depending on the position of the display unit 22, but the guidance subject period may be the same length regardless of the position of the display unit 22. Moreover, the guidance subject period may be data in a table form, or data in a numerical equation form.

(6) Moreover, for example, based on the evaluation result by the game operation evaluation unit 80, a sound may be output from the audio output unit 36. For example, when the user acquires a high evaluation, a sound corresponding to a part of a musical instrument may be output from the audio output unit 36.

For example, when the position of the display unit 22 is in the first position (such as the horizontal position), based on the evaluation result by the game operation evaluation unit 80, a sound (such as a tone of the bass guitar) corresponding to the one or plurality of first musical instruments (such as the bass guitar) may be output from the audio output unit 36. Moreover, for example, when the position of the display unit 22 is in the second position (such as the vertical position), based on the evaluation result by the game operation evaluation unit 80, a sound (such as a tone of the lead guitar) corresponding to the one or plurality of second musical instruments (such as the lead guitar) may be output from the audio output unit 36.

(7) Moreover, for example, according to the embodiment, the description has been given of the case where the reference time data is determined for each of parts for musical instruments, but the reference time data only needs to be associated with the position of the display unit 22. For the cases where the display unit 22 is in the horizontal position and the vertical position, reference time data representing the same musical instrument part may be specified. However, in this case, a content of the reference time data associated with the horizontal position and a content of the reference time data associated with the vertical position are different from each other. For example, the latter reference time data may be set to have a larger number of reference times so as to be higher in difficulty than the former reference time data.

(8) Moreover, for example, the present invention can be applied to a game other than the music game described in this embodiment. For example, a music piece may not be constituted by parts for a plurality of musical instruments. For example, a music piece may be constituted by only a part for a Japanese drum.

3. Second Embodiment

A description is now given of another embodiment of the game device 10 according to the present invention. According to prior art, a user can continue the game play without bringing the game device 10 into a given position, but in a game produced on the assumption that a user changes the position of the game device 10, in order for the user to enjoy the game play, the user preferably plays the game while bringing the game device 10 into a given position.

The game device 10 according to a second embodiment has been devised in view of the foregoing problem, and has an object of ensuring that the user plays the game in a state in which the user brings the game device into a given position. The game device 10 according to the second embodiment may ensure that the user plays the game in the state in which the game device 10 is in the given position. A detailed description is now given of the second embodiment referring to drawings.

(3-1. Hardware Configuration of Game Device)

A hardware configuration of the game device 10 according to the second embodiment is the same as that of the first embodiment, and a description thereof is therefore omitted.

(3-2. Games Executed on Game Device According to Second Embodiment)

A description is now given of games executed on the game device 10 according to the second embodiment. In the game device 10, a game for requesting a user to change the position of the game device 10 when the situation of the game being executed reaches a predetermined situation, is executed.

In this embodiment, a description is given of a case where the game device 10 executes a game in which the user carries out a game operation in time with a music piece. In a predetermined period during a reproduction period of the music piece, the user is requested to change the position of the game device 10. A description is given below of, as an example, a case of execution of a game in which the user touches a given position on the touch panel 24 in time with the music piece.

When the user starts the game, the user selects any of a plurality of music pieces prepared in advance. Then, the selected music piece is reproduced. For each of music pieces which the user can select, a situation (hereinafter simply referred to as "reference situation") of the game in which the position of the game device 10 should be changed, and a time (hereinafter simply referred to as "reference time") at which the game operation should be carried out are determined. The user changes the position of the game device 10 in the reference situation. Moreover, the user tries to carry out the game operation at a time coincident with the reference time.

Figure 13:
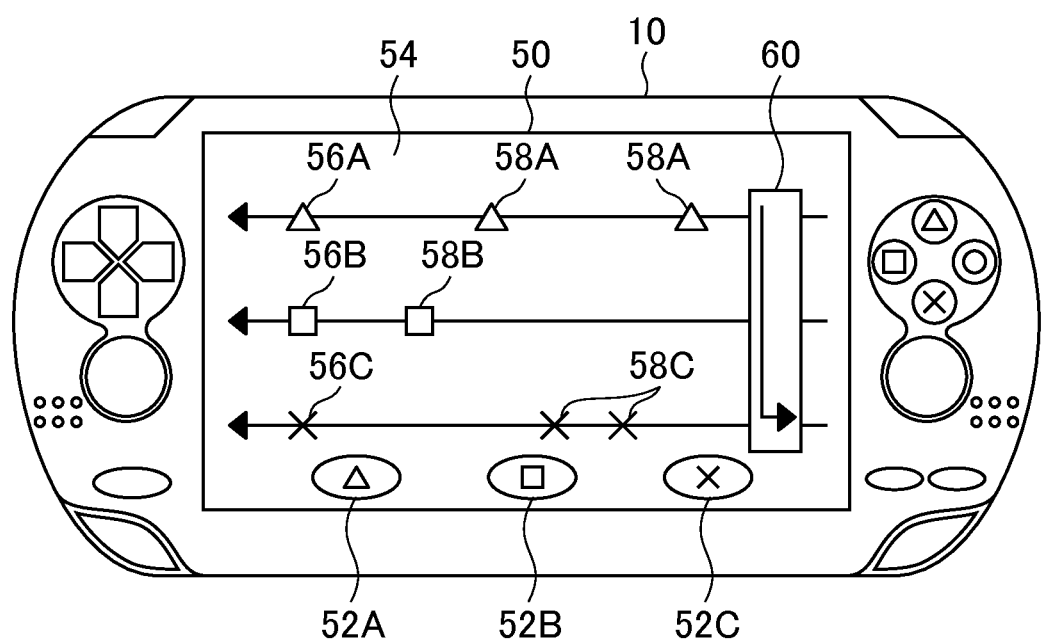
FIG. 13 A diagram illustrating an example of the game screen displayed on the display unit of the game device.

FIG. 13 is a diagram illustrating an example of the game screen displayed on a display unit 22 of the game device 10. The game device 10 is sized so as to be held by the user. As illustrated in FIG. 13, on a game screen 50, a lower area viewed from the user displays buttons 52A, 52B, and 52C (these buttons are hereinafter generally and simply also referred to as buttons 52). A touch panel 24 is provided so as to overlap the display unit 22, and, for example, an action of the user touching the buttons 52 corresponds to the "game operation".

On the game screen 50, a guidance area 54 is displayed. The guidance area 54 is an area for guiding the user in the reference situation in which the user should change the position of the game device 10, and shows the reference time at which the user should touch the button 52.

Reference marks 56A, 56B, and 56C (these marks are hereinafter generally and simply also referred to as reference marks 56) are displayed in a left-side area of the guidance area 54. Moreover, for example, reference time guidance marks 58A, 58B, and 58C (these marks are hereinafter generally and simply also referred to as reference time guidance marks 58) or a reference situation guidance mark 60 are displayed on the right side of the reference marks 56. The reference time guidance marks 58 and the reference situation guidance mark 60 gradually move from the right to the left as the time elapses. In other words, the reference time guidance marks 58 and the reference situation guidance mark 60 approach the reference marks 56.

The reference marks 56 correspond to the buttons 52 arranged in the area below the guidance area 54. When a time (reference time) at which the button 52A is to be touched arrives, the reference time guidance mark 58A reaches the reference mark 56A, and overlaps the reference mark 56A. When a time (reference time) at which the button 52B is to be touched arrives, the reference time guidance mark 58B reaches the reference mark 56B, and overlaps the reference mark 56B. When a time (reference time) at which the button 52C is to be touched arrives, the reference time guidance mark 58C reaches the reference mark 56C, and overlaps the reference mark 56C.

For example, when the reference times corresponding to the buttons 52A, 52B, and 52C arrive, the user can acquire a high evaluation by touching the buttons 52A, 52B, and 52C. Note that it is not necessarily the case that the user cannot acquire an evaluation unless the user touches the buttons 52A, 52B, and 52C at times completely matching the reference times, and an evaluation is given depending on a degree of matching.

Moreover, when the situation of the game being executed is brought into the reference situation in which the position of the game device 10 should be changed, the reference situation guidance mark 60 reaches the reference marks 56, and overlaps the reference marks 56. Moreover, for example, on the reference situation guidance mark 60, a direction (rotation direction) to which the user should change the position of the game device 10 may be shown.

In this way, the user can rely on the reference time guidance marks 58 and the reference situation guidance mark 60 which are gradually approaching the reference marks 56, thereby recognizing the times at which the user should touch the buttons 52 and the reference situation in which the user should change the position of the game device 10.

As described above, when the game being executed is brought into a predetermined situation (brought into the reference situation), the user changes the position of the game device 10. Note that in this embodiment, as illustrated in FIG. 13, a position in which the display unit 22 of the game device 10 viewed from the user is long in the horizontal direction is referred to as "horizontal position". Moreover, for example, as illustrated in FIG. 13, an orientation of the game screen 50 when the display unit 10 is in the horizontal position is referred to as "horizontal state". In other words, when the game being executed is brought into the reference situation, the user changes the game device 10 from the horizontal position to another position.

For example, when a music piece being reproduced approaches a lively period (climax), the reference situation guidance mark 60 for guiding the user to change the position of the game device 10 is displayed. For example, when the reference situation guidance mark 60 reaches the reference marks 56, the orientation of the game screen 50 changes. In response to the change in the orientation of the game screen 50, the user changes the position of the game device 10.

Figure 14:
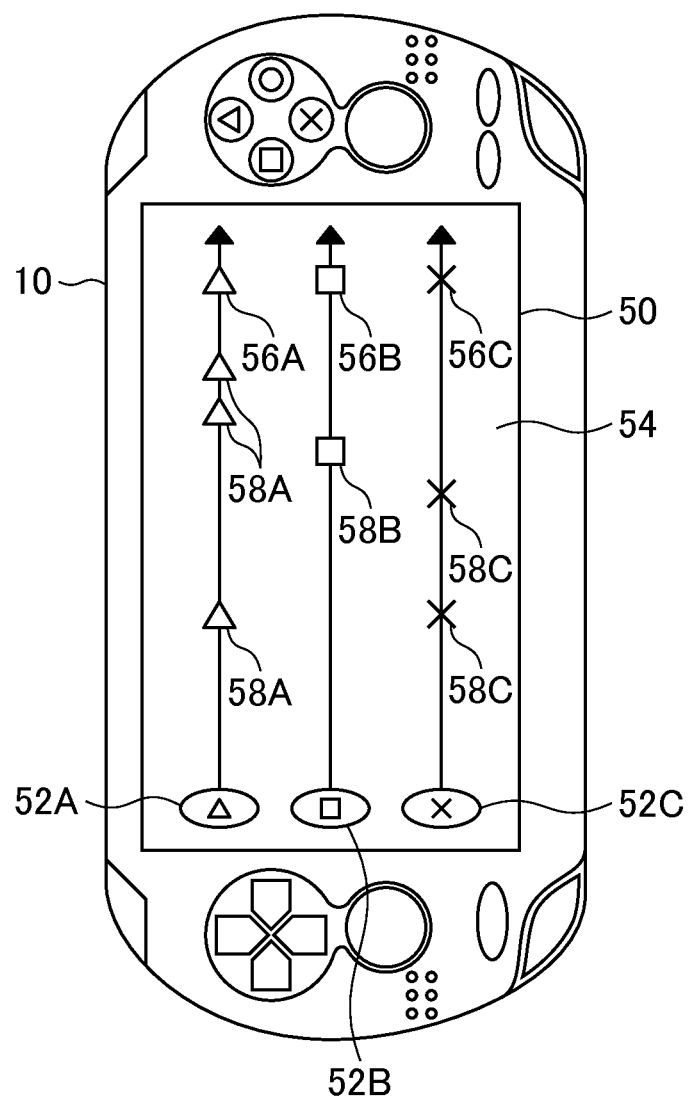
FIG. 14 A diagram illustrating an example of a case where an orientation of the game screen has changed.

FIG. 14 is a diagram illustrating an example of a case where the orientation of the game screen 50 has changed. As illustrated in FIG. 14, for example, the orientation of the game screen 50 rotates. Then, for example, the user rotates the display unit 22 counterclockwise. For example, the display positions of the buttons 52 are changed so that the buttons 52 are arranged on the lower side (shorter side of the display unit 22) viewed from the user. Moreover, for example, the display positions of the reference marks 56 are changed so that the reference marks 56 are arranged on the top side as viewed from the user.

Moreover, for example, in the situation in FIG. 13, the reference time guidance marks 58 and the reference situation guidance mark 60 move leftward as viewed from the user, but in the situation in FIG. 14, the reference time guidance marks 58 and the reference situation guidance mark 60 move upward as viewed from the user. In other words, as the display positions of the reference marks 56 change, the display content of the guidance area 54 is changed.

Note that in this embodiment, as illustrated in FIG. 14, a position in which the display unit 22 of the game device 10 viewed from the user is long in the vertical direction is referred to as "vertical position". Moreover, for example, as illustrated in FIG. 14, an orientation of the game screen 50 when the display unit 10 is in the vertical position is referred to as "vertical state".

As described above, during a lively period of a music piece, the user plays a game while changing the game device 10 from the horizontal position to the vertical position, and the user thus plays the game while distinguishing the lively period and the other periods of the music piece from each other. For example, as illustrated in FIG. 14, in a lively period of a music piece, a game is produced to execute the display control so that the reference time guidance marks 58 and the reference situation guidance mark 60 move upward as viewed from the user. In this case, during the lively period of the music piece, the user plays the game while the game device 10 is placed in the vertical position, and the user can thus feel excitement.

In the game device 10 according to this embodiment, when the situation of a game being executed is brought into the reference situation, and the user does not change the position of the game device 10 to the reference position, the buttons 52 are configured so as not to react even when the buttons 52 are touched. For example, there is provided such a configuration that, when a lively period of a music piece arrives, if the user does not change the game device 10 from the horizontal position to the vertical position, the buttons 52 do not react. A detailed description is now given of this technology.

(3-3. Functions Realized in Game Device)

Figure 15:
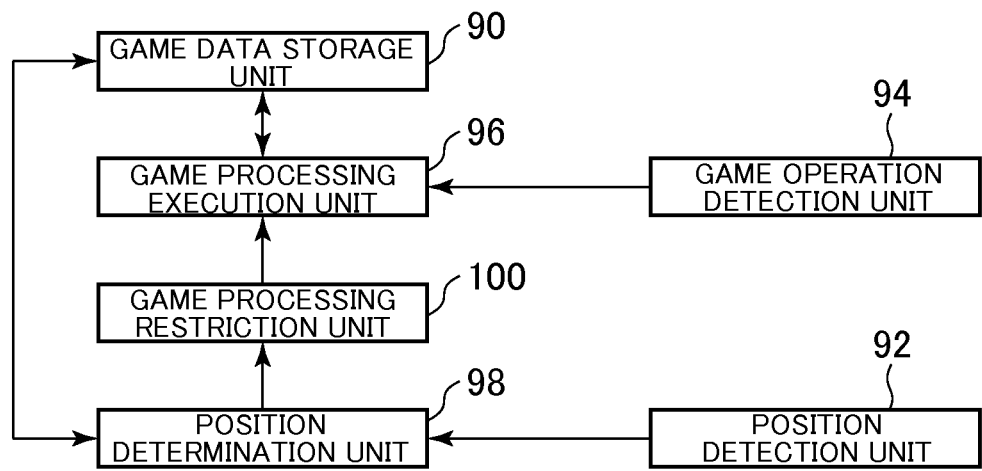
FIG. 15 A functional block diagram illustrating functions realized in the game device.

FIG. 15 is a functional block diagram illustrating functions realized in the game device 10. As illustrated in FIG. 15, the game device 10 includes a game data storage unit 90, a position detection unit 92, a game operation detection unit 94, a game processing execution unit 96, a position determination unit 98, and a game processing restriction unit 100.

(3-3-1. Game Data Storage Unit)

The game data storage unit 90 (corresponding to the game data storage unit 70 of the first embodiment) is realized mainly by the main memory 18 and the memory card 30. The game data storage unit 90 stores data required for executing a game. For example, the game data storage unit 90 stores data of a plurality of music pieces.

Figure 16:
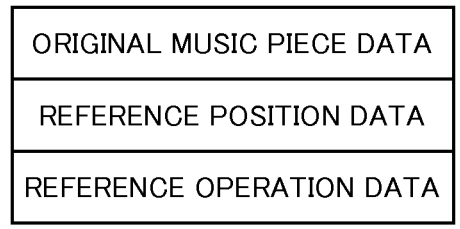
FIG. 16 A diagram illustrating an example of music piece data corresponding to one music piece.

FIG. 16 is a diagram illustrating an example of the music piece data corresponding to one music piece. As illustrated in FIG. 16, the music piece data includes original music piece data, reference position data, and reference operation data. The original music piece data is, for example, general popular music and the like stored in a predetermined data format.

The reference position data is data in which a situation of the game and a reference position of the game device are associated with each other. In this embodiment, in the reference position data, a reference situation of a game and a reference position of the game device 10 are associated with each other.

The reference situation of the game stored in the reference position data is a predetermined situation out of situations the game being executed can take, and is a situation in which the position of the game device 10 should be changed. In this embodiment, a description is given of a case where the reference situation is a situation in which the position of the game device 10 should be changed to a reference position. For example, in the reference position data, parameters representing the predetermined situation out of the situations the game being executed can take are stored as information representing the reference situation.

In this embodiment, a description is given of a case where the reference situation of a game represents an elapsed time after the reproduction of a music piece started. In other words, for example, when the elapsed time after the reproduction of the music piece started is within a predetermined period (for example, within a climax period in which the music piece becomes lively), it is determined that the game being executed is brought into the reference situation.

The reference positions of the display unit 22 stored in the reference position data are predetermined positions out of positions of the game device 10 which can be detected by the position detection unit 92, and are positions relating to positions which the game device 10 should take in the reference situations. In this embodiment, a description is given of a case where the reference position is a position of the game device 10 which the user should achieve in a reference situation. Moreover, a description is given of a case where, as the reference positions of the game device 10, the vertical position (first position) in which the display unit 22 viewed from the user is long in the vertical direction, and the horizontal position (second position) in which the display unit 22 viewed from the user is long in the horizontal direction, are set.

Figure 17:
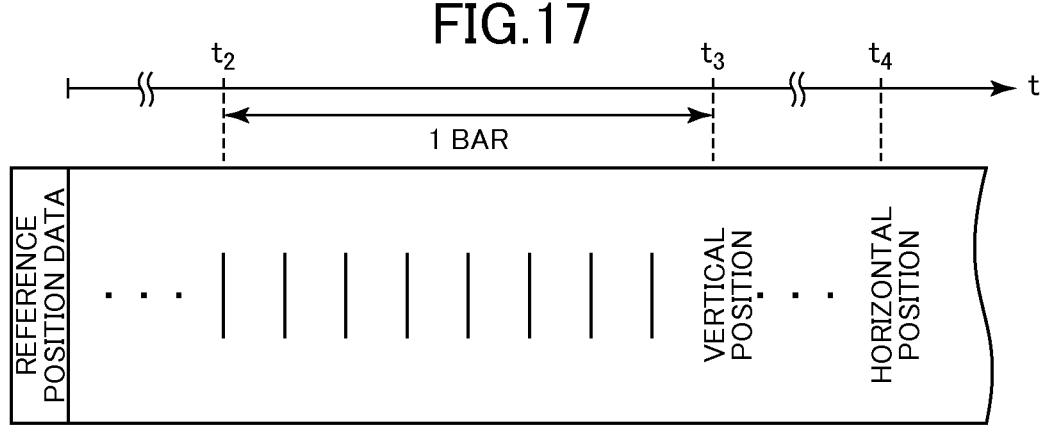
FIG. 17 A diagram illustrating a data storage example of reference position data.

FIG. 17 is a diagram illustrating a data storage example of the reference position data. A "t axis" illustrated in FIG. 17 is a time axis. The t axis represents elapsed time after the reproduction of the music piece starts. For example, the reference position data represents a reference situation (time) where the position of the game device 10 should be changed in units of $\frac{1}{8}^{th}$ of a bar. FIG. 17, for the sake of simple description, illustrates data obtained by dividing one bar into eight parts. In other words, FIG. 17 illustrates the reference situations where the user should change the position of the game device 10 in units of $\frac{1}{8}^{th}$ of a bar.

As illustrated in FIG. 17, at each time point of $\frac{1}{8}^{th}$ of a bar, whether or not the user should change the position of the game device 10 is specified. For example, in the reference situation in which the position of the game device 10 should be changed, information for identifying a reference position which the game device 10 should take is stored.

For example, at a time at which information representing the "vertical position" is stored (time $t_3$), the user changes the position of the game device 10 to the vertical position. In other words, the arrival of the time $t_3$ means that the game is brought into the reference situation. Further, for example, at a time at which information representing the "horizontal position" is stored (time $t_4$), the user changes the position of the game device 10 to the horizontal position. In other words, the arrival of the time $t_4$ also means that the game is brought into the reference situation.

The user plays a game while holding the game 10 in the horizontal position until the time $t_3$ arrives, for example. On the other hand, during a period from the time $t_3$ to the time $t_4$ (such as a climax period where a music piece becomes lively), the user plays the game while holding the game device 10 in the vertical position. The user plays the game after the time $t_4$ while holding the game device 10 in the horizontal position.

As described above, the user carries out the game operation while changing the position of the game device 10. When and what game operation the user should carry out are defined in the reference operation data.

Figure 18:
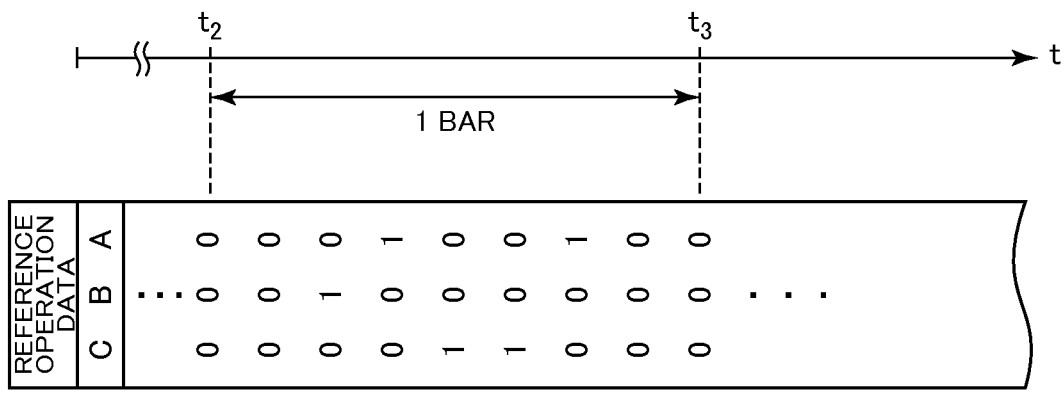
FIG. 18 A diagram illustrating an example of reference operation data.

FIG. 18 illustrates an example of the reference operation data. A "t axis" illustrated in FIG. 18 is similar to the "t axis" of FIG. 17. In other words, the reference operation data represents times when the buttons 52A, 52B, and 52C should be touched in units of $\frac{1}{256}^{th}$ of a bar, and for the sake of simple description, data in which the one bar is divided into eight parts is described.

As illustrated in FIG. 18, whether or not the buttons 52A, 52B, and 52C should be touched at each time point of $\frac{1}{8}^{th}$ of a bar is represented by, for example, three-bit data. In FIG. 18, a bit represented by "A" corresponds to the button 52A. "0" represents that the button 52A should not be touched. On the other hand, "1" represents that the button 52A should be touched.

Similarly, bits of "B" and "C" respectively correspond to the buttons 52B and 52C. In other words, it is considered that data including three bits, at least one of which is "1", is data representing a reference time.

According to this embodiment, based on the above-mentioned reference position data and reference operation data, display contents of the game screen 50 are determined. For example, when the situation of a game being executed is brought into a reference situation, processing of guiding the user to change the position of the game device 10 to a reference position is executed.

Figure 19:
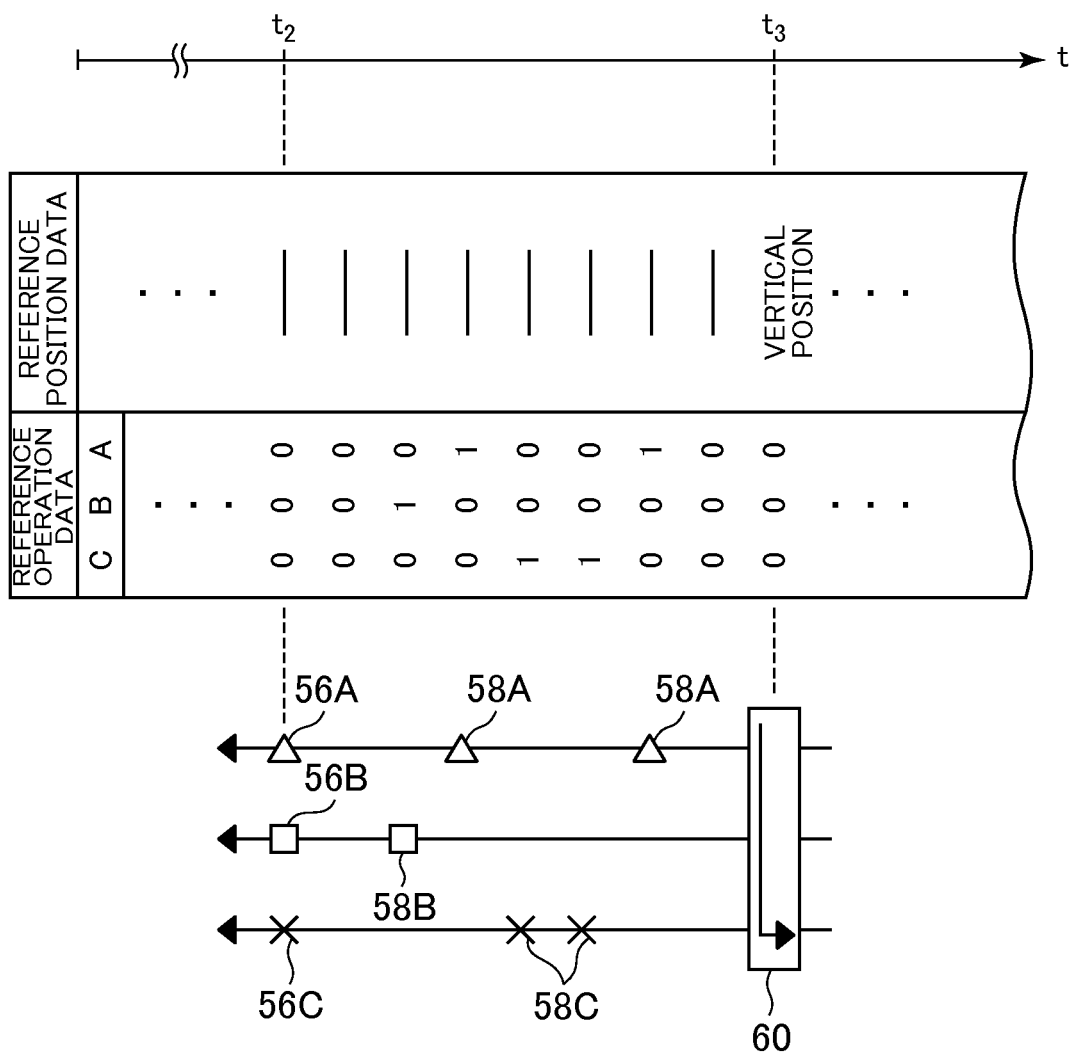
FIG. 19 A diagram illustrating display processing for the game screen.

FIG. 19 is a diagram illustrating display processing for the game screen 50. In other words, FIG. 19 is a diagram illustrating a relationship between the reference position data and the reference situation guidance mark 60, and a relationship between the reference operation data and display positions of the reference time guidance marks 58.

While a music piece is being reproduced, data in a predetermined period after the current time point (hereinafter referred to as "guidance subject period") is readout from the reference position data and the reference operation data. Here, a description is given of a case where the guidance subject period is a period of one bar from the current time point. For example, when the current time point is a time $t_2$, the reference position data and the reference operation data from the time $t_2$ to a time $t_3$ are read out.

Based on the read data, a reference situation guidance mark 60 for providing guidance for the reference position and reference time guidance marks 58 for providing guidance for reference times in the guidance subject period are displayed on the game screen 50.

For example, based on the reference position data, a guidance image (such as reference situation guidance mark 60) for guiding the user for reference situation and reference position after the current time point is displayed on the game screen 50. For example, in the guidance areas 54 on the game screen 50, the reference situation guidance mark 60 gradually moves toward the display positions (reference positions) of the reference marks 56.

The display position of the reference situation guidance mark 60 is adjusted so that the distance between the reference situation guidance mark 60 and the reference mark 56 is a distance corresponding to a time until the reference situation arrives. For example, as a time until a reference situation in which the user should change the position of the game device 10 arrives decreases, the distance from the reference situation guidance mark 60 to the reference mark 56 decreases.

Similarly, based on the reference operation data, guidance images (such as reference time guidance marks 58) for guiding the user for reference times after the current time point are displayed on the game screen 50. For example, in the guidance area 54 on the game screen 50, the reference time guidance marks 58 gradually move toward the display positions (reference positions) of the reference marks 56.

The display position of the reference time guidance mark 58 is adjusted so that the distance between the reference time guidance mark 58 and the reference mark 56 is a distance corresponding to a time until the reference time arrives. For example, as the time until the arrival of the reference time at which the user should touch the button 52A decreases, the distance from the reference time guidance mark 58A to the reference mark 56 decreases.

Moreover, according to this embodiment, the display control for the game screen 50 is executed so that the orientation of the game screen 50 displayed on the display unit 22 is directed to an orientation corresponding to a reference position associated with the current situation of a game being executed. For example, a description is given of a case where, when the game being executed is brought into a reference situation, the display control for the game screen 50 is executed so that the orientation of the game screen 50 is directed to an orientation corresponding to the reference position associated with the reference situation.

The orientation corresponding to the reference situation is an orientation of the game screen 50 when the game device 10 takes the reference position, and the reference position and the orientation of the game screen 50 are associated with each other in advance. For example, the display control is executed so that when a reference situation arrives, the orientation of the game screen 50 is changed from the horizontal state of FIG. 13 to the vertical state of FIG. 14.

Returning to FIG. 15, the game data storage unit 90 stores, in addition to the above-mentioned data, game situation data representing a situation of a game being executed. In the game situation data, for example, an elapsed time after reproduction of a music piece starts, and a score data representing a score of a user are stored.

The score data changes in value based on an evaluation made for the user. For example, when the user acquires a high evaluation, a value of the score data increases. On the other hand, when the user acquires a low evaluation, a value of the score data decreases. At a time point of a start of a game, an initial value may be set for the score data.

Note that the control unit 14 functions as means for acquiring various kinds of data to be stored in the game data storage unit 90. Moreover, the control unit 14 functions as means for changing (updating) the various kinds of data stored in the game data storage unit 90. Moreover, data stored in the game data storage unit 90 is not limited to the above-mentioned example, and data required by the game device 10 for executing a game may be stored. In addition, for example, image data for the horizontal state and image data for the vertical state may be stored.

(3-3-2. Position Detection Unit)

The position detection unit 92 (corresponding to the position detection unit 72 according to the first embodiment) is realized mainly by the control unit 14 and the sensor unit 42. The position detection unit 92 detects the position of the game device 10. According to this embodiment, the display unit 22 and the game operation detection unit 94 (such as the touch panel 24) are integrated with each other in the game device 10, and the position of the game device 10 means the position of the display unit 22 and the game operation detection unit 94.

The position detection unit 92 detects the position of the game device 10 based on a detection signal of the sensor unit 42. According to this embodiment, the position detection unit 92 detects the vertical position of the game device 10 and the horizontal position of the game device 10.

Note that various publicly known methods can be applied to the method of detecting the position of the game device 10 based on the detection signal of a gyro sensor, an acceleration sensor, or the like. For example, when the game device 10 includes a CCD camera, the position of the game device 10 may be acquired based on a change in the images successively photographed by the CCD camera.

(3-3-3. Game Operation Detection Unit)

The game operation detection unit 94 (corresponding to the game operation detection unit 78 of the first embodiment) is realized mainly by the control unit 14 and the touch panel 24. The game operation detection unit 94 detects a game operation carried out by the user. The game operation detection unit 94 detects the game operation based on an operation content received from operation means operated by the user. According to this embodiment, for example, the game operation detection unit 94 detects a game operation by determining whether or not the button 52 is touched by the user based on an operation signal supplied from the touch panel 24.

(3-3-4. Game Processing Execution Unit)

The game processing execution unit 96 is realized mainly by the control unit 14. The game processing execution unit 96 executes game processing corresponding to a game operation detected by the game operation detection unit 94. The game processing is processing relating to a game being executed, and is, for example, processing of updating the game situation data, processing of evaluating a game operation carried out by the user, and effect processing.

The game processing corresponding to a game operation is game processing executed as a result of detection of the game operation. In this embodiment, a description is given of a case where, as the game processing corresponding to a game operation, game processing of evaluating a game operation carried out by the user is executed based on the reference operation data and a detection result by the game operation detection unit 94.

For example, the game processing execution unit 96 evaluates a game operation based on a deviation between the reference time represented by the reference operation data and a time (hereinafter referred to as "operation time") when the user has actually carried out the game operation. For example, as the deviation in time between the reference time and the operation time decreases, the evaluation for the game operation increases. Depending on the evaluation, the value of the score data increases/decreases.

(3-3-5. Position Determination Unit)

The position determination unit 98 is realized mainly by the control unit 14. The position determination unit 98 determines whether or not the position of the game device 10 detected by the position detection unit 92 is a reference position associated with a situation of a game being executed. For example, the position determination unit 98 determines, when the game being executed is brought into a reference situation, whether or not the position of the game device 10 detected by the position detection unit 92 is a reference position associated with the reference situation.

The position determination unit 98 determines, by comparing the current situation of the game represented by the game situation data and the reference situation represented by reference position data with each other, whether or not the game being executed has been brought into the reference situation. According to this embodiment, by determining whether or not an elapsed time of a music piece being reproduced is within a period represented by the reference situation, whether or not the game being executed has been brought into the reference situation is determined.

Moreover, the position determination unit 98 determines, by comparing the position of the game device 10 detected by the position detection unit 92 and the reference position associated with the reference situation by the reference position data with each other, whether or not the position of the game device 10 is the reference position. For example, by determining whether or not a deviation between the position of the game device 10 detected by the position detection unit 92 and the reference position is within a predetermined range, whether or not the position of the game device 10 is the reference position is determined.

(3-3-6. Game Processing Restriction Unit)

The game processing restriction unit 100 is realized mainly by the control unit 14. Based on a determination result by the position determination unit 98, the game processing restriction unit 100 restricts execution of the game processing, which is performed by the game processing execution unit 96, and corresponds to a game operation detected by the game operation detection unit 94.

For example, when the position determination unit 98 does not determine that the current position of the game device 10 is a reference position, the game processing restriction unit 100 restricts the execution of the game processing by the game processing execution unit 96. For example, in this case, even when the user touches the button 52, the evaluation processing caused by the touch is not executed. For example, by providing control so that the button 52 does not react, the execution of the game processing is restricted.

Although in this embodiment, as a method for the game processing restriction unit 100 restricting the game processing, the case where the button 52 is restricted so as not to react even when the user touches the button 52 is described, but the restriction method by the game processing restriction unit 100 is not limited to this case. The game processing restriction unit 100 only needs to restrict the game processing that is executed by the game processing execution unit 96.

In other words, the game processing restriction unit 100 may restrict the game processing by the game processing execution unit 96 when the user carries out a game operation, by executing processing different from ordinary game processing (namely, game processing for a case where the display unit 22 takes the reference position). For example, when the user touches the button 52, a low evaluation may be given, or a message for guiding the user to place the game device 10 in a reference position may be output.

(3-4. Processing Executed by Game Device)

Figure 20:
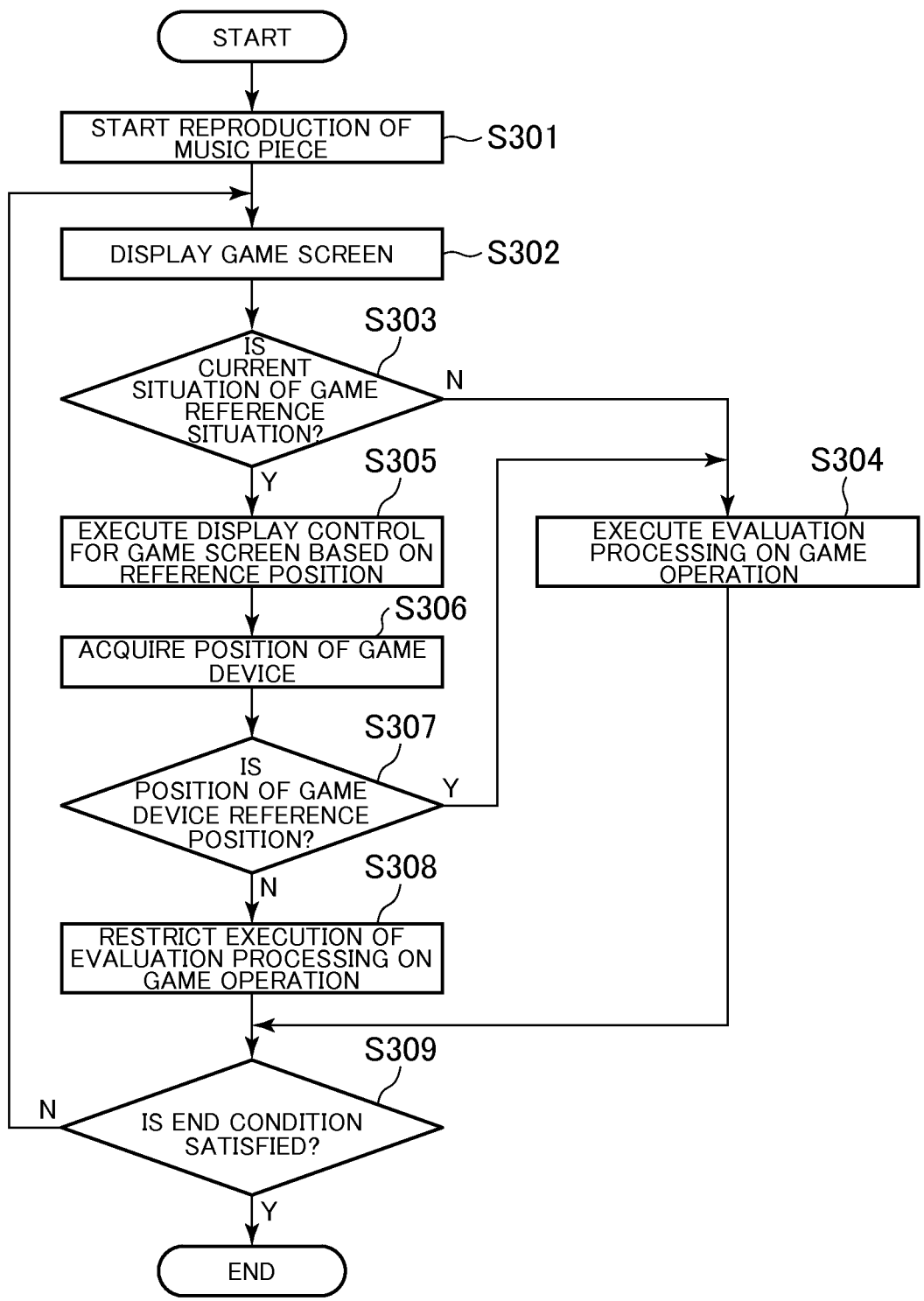
FIG. 20 A flowchart mainly illustrating processing, of processing executed by the game device, that relates to the present invention.

Next, a description is given of processing executed by the game device 10. FIG. 20 is a flowchart mainly illustrating processing relating to the present invention, of the processing executed by the game device 10. The control unit 14 executes the processing illustrated in FIG. 20 in accordance with, for example, the program stored in the memory card 30.

As illustrated in FIG. 20, first, the control unit 14 starts the reproduction of a music piece (S301). The control unit 14 reads out the reference position data and the reference operation data in the guidance subject period, and provides control to display the game screen 50 (S302). In S302, based on the time differences between an elapsed time of the music piece at the current time point and the reference situation and between the elapsed time and the reference time, the display control for the reference situation guidance mark 60 and the reference time guidance marks 58 is executed.

The control unit 14 determines whether or not the current situation of the game is in a reference situation (S303). In S303, it is determined whether or not the elapsed time of the music piece at the current time point is within a period represented by a reference situation stored in the reference position data. When it is determined that the current situation of the game is not a reference situation (N in S303), the control unit 14 executes the evaluation processing on a game operation carried out by the user (S304). The processing executed in S304 is the same as the processing (refer to FIG. 12) executed in S111 in the first embodiment, and a description thereof is therefore omitted.

On the other hand, when it is determined that the current situation of the game is a reference situation (Y in S303), the control unit 14 executes the display control for the game screen 50 based on a reference position stored in the reference position data, (S305). For example, the display control for the game screen 50 is executed so that the game screen 50 is directed in an orientation corresponding to the reference position. For example, when the game device 10 is changed from the horizontal position to the vertical position, the game screen 50 changes from the horizontal state of FIG. 13 to the vertical state of FIG. 14. On the other hand, when the game device 10 is changed from the vertical position to the horizontal position, the game screen 50 changes from the vertical state of FIG. 14 to the horizontal state of FIG. 13.

The control unit 14 acquires the position of the game device 10 based on a detection signal of the sensor unit 42 (S306). The control unit 14 determines, by comparing the position of the game device 10 acquired in S306 and the reference position stored in the reference position data, whether or not the position of the game device 10 is a reference position (S307).

When it is determined that the position of the game device 10 is a reference position (Y in S307), the processing proceeds to S304. In other words, the position of the game device 10 is a reference position, and the evaluation processing on a game operation carried out by the user is thus executed without restriction.

When it is determined that the position of the game device 10 is not a reference position (N in S307), the control unit 14 restricts the execution of the evaluation processing on a game operation carried out by the user (S308). In other words, in this case, the restriction is imposed so as not to execute the evaluation processing on a game operation in S304. Thus, even when the user touches the button 52, the evaluation processing resulting from the touch is not executed. Note that while the execution of the evaluation processing on a game operation is restricted, when the determination period reaches an end, and the operation completion flag is "1", the operation completion flag is updated to "0".

The control unit 14 determines whether or not an end condition is satisfied (S309). It is only necessary for the end condition to be a condition determined in advance, and examples of the end condition include whether or not a music piece has finished, and whether or not the score represented by the score data is in a predetermined range.

When it is determined that the end condition is satisfied (Y in S309), the control unit 14 finishes the processing. When it is not determined that the end condition is satisfied (N in S309), the processing returns to S302.

According to the above-mentioned game device 10, when the situation of a game being executed is brought into a reference situation, the restriction is imposed on the user so that a game operation is not evaluated unless the user plays the game while the game device 10 is placed in a reference position. Thus, it is ensured that the user plays the game while the game device 10 is placed in a given position.

Moreover, when the situation of a game being executed is brought into a reference situation, by changing the orientation of the game screen to an orientation corresponding to a reference position, an optimal game screen 50 which is realized when the game device 10 is in the reference situation can be provided for the user.

4. Modified Examples

Note that the present invention is not limited to the second embodiment described above. Changes can be appropriately made without departing from the gist of the present invention.

(1) For example, according to the second embodiment, the description has been given of the case where, when the situation of a game is brought into a reference situation, and the user does not place the game device 10 in a reference position, the touch on all the buttons 52 is invalidated, but touch on only some of the buttons 52 may be invalidated. For example, a game operation corresponding to game processing to be restricted may be defined in the reference position data.

In this case, the reference position data is data in which the situation of a game, a reference position of the game device 10, and a game operation carried out by the user are associated with one another.

Figure 21:
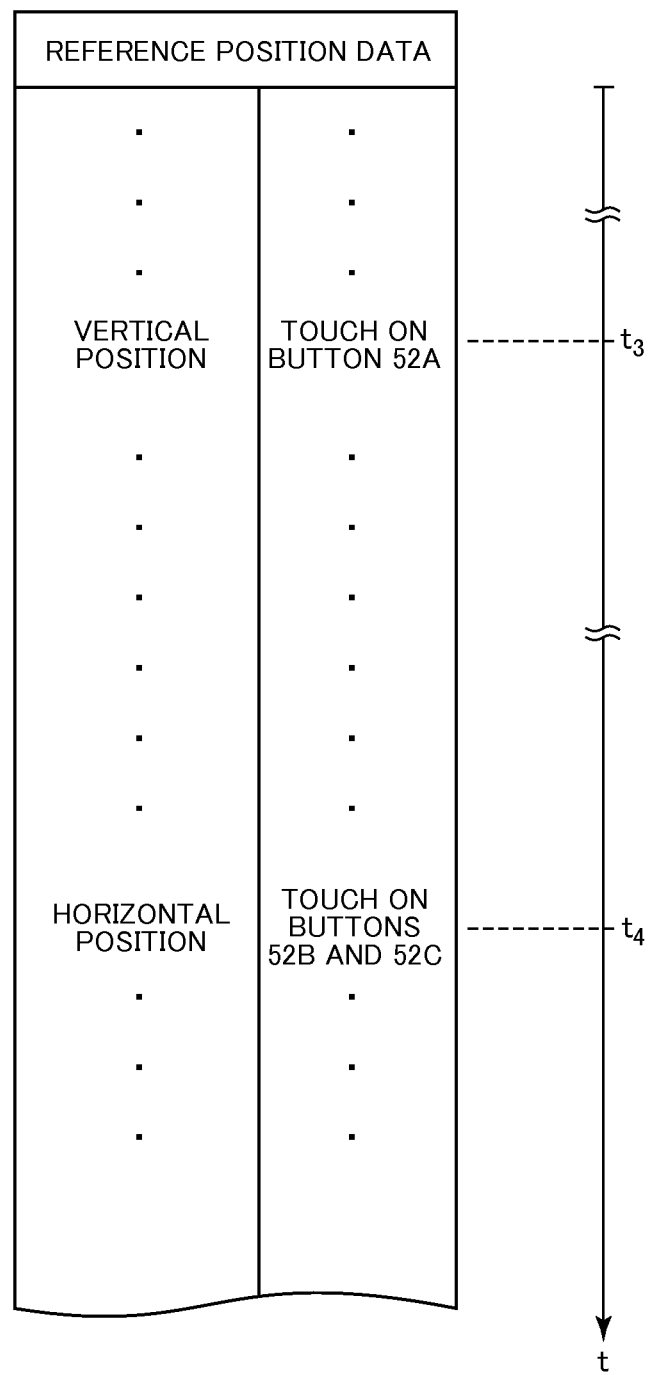
FIG. 21 A diagram illustrating the reference position data in Modified Example (1) of a second embodiment.

FIG. 21 is a diagram illustrating the reference position data in Modified Example (1) of the second embodiment. As illustrated in FIG. 21, game operations corresponding to game processing to be restricted by the game processing restriction unit 100 are associated with the reference position data. For example, when a time $t_3$ arrives, and the user does not place the display unit 22 in the vertical position, evaluation processing on touch on the button 52A is restricted. In this case, evaluation processing on touch on the buttons 52B and 52C is not restricted.

Moreover, for example, when a time $t_4$ arrives, and the user does not place the display unit 22 in the horizontal position, evaluation processing on touch on the buttons 52B and 52C is restricted. In this case, evaluation processing on touch on the button 52A is not restricted.

Based on a determination result by the position determination unit 98, the game processing restriction unit 100 according to Modified Example (1) restricts, among game operations detected by the game operation detection unit 94, the execution of game processing corresponding to a game operation associated with the situation of a game being executed and the reference position. In other words, for example, of the game operations detected by the game operation detection unit 94, game processing corresponding to a game operation which is not associated with the situation of the game being executed and the reference position is executed. Thus, of the game operations detected by the game operation detection unit 94, the execution of game processing corresponding to some of the game operations determined based on the situation of the game being executed and the reference position is restricted.

According to Modified Example (1), the game processing restricted by the game processing restriction unit 100 may be changed depending on the situation of a game being executed and a reference position.

(2) Moreover, for example, according to the embodiment, the description has been given of the case, as an example, where a reference situation represents whether or not the reproduction time of a music piece is brought into a predetermined period, but the reference situation is not limited to this example, and the reference situation may be a situation which the game can be brought into. In addition, for example, the reference situation may represent whether or not the score represented by the score data is brought into a predetermined range. In this case, for example, when the score represented by the score data exceeds a reference value, the user changes the game device 10 from the horizontal position to the vertical position, and then plays the game.

(3) Moreover, according to the embodiment, the description has been given of the case where a reference position represents a position which the game device 10 should take in a reference situation, but the reference position may represent a position which the game device 10 should not take in a reference situation. For example, in a lively period of a music piece, in a case where the game device 10 is to be placed in the vertical position, as the reference position, the horizontal position may be defined. In other words, in this case, when the position determination unit 98 determines that the current position of the game device 10 is a reference position, the game processing restriction unit 100 restricts the execution of the game processing by the game processing execution unit 96.

Moreover, the description has been given of the case, as an example, where the reference position includes the horizontal position and the vertical position, but the reference position is not limited to those positions, and the reference position only needs to be a position of the game device 10 which can be detected by the sensor unit 42. In addition, for example, the reference position may be the position acquired by rotating the horizontal position illustrated in FIG. 13 by 180 degrees (position in which the user holds the game device 10 upside down).

(4) Moreover, for example, the description has been given of the case where the game operation carried out by the user is the touch on the button 52, but the game operation is not limited to this case. In addition, for example, depression of the operation key unit 32 may be the game operation, and various publicly known operations can be applied as the game operation. Similarly, the game processing corresponding to a game operation is not limited to the example of the embodiment. Processing to be executed as a result of a game operation may be applied as the game processing.

(5) Moreover, for example, the description has been given of the case where, as the method of restricting the game processing by the game processing restriction unit 100, the processing in S304 is skipped so that game processing corresponding to a detected game operation is not executed, but the method of restricting the game processing by the game processing restriction unit 100 is not limited to this case. In addition, for example, the game processing restriction unit 100 may provide a restriction in which the game processing for the game operation is not executed, by imposing a restriction on the detection itself of a game operation by the game operation detection unit 94. In this case, for example, the touch panel 24 may be turned off.

(6) Moreover, for example, the present invention can be applied to a game other than the music game. The present invention can be applied to a game in which game processing corresponding to a game operation carried out by the user is executed, and the user changes the position of the game device 10 during the execution of the game.

In addition, for example, the present invention may be applied to a simulation game in which the user communicates with a character. In this case, for example, the reference situation is a situation in which a predetermined game event occurs. When the situation is brought into a reference situation, the user changes the position of the game device 10, thereby communicating with the character. As in the embodiment, when the position of the game device 10 is not changed, for example, the execution of game processing corresponding to the game operation carried out by the user for communicating with the character is restricted.

Moreover, for example, the present invention may be applied to a shooting game and a role playing game in which the user plays the game by operating an operation subject. In this case, the reference situation is a situation of a case where a predetermined enemy appears. When the situation is brought into a reference situation, the user changes the position of the game device 10, thereby fighting against the enemy. As in the embodiment, when the position of the game device 10 is not changed, for example, the execution of game processing corresponding to the game operation carried out by the user for attacking the enemy is restricted.

Moreover, for example, the first and second embodiments may be combined. In other words, while the reference time data is switched depending on the position of the display unit 22, a restriction may be provided so that game processing is restricted unless the position corresponding to a situation is not attained. Similarly, the Modified Examples of the first embodiment and the Modified Examples of the second embodiment may be combined.

The invention claimed is:

1. A game device for executing a game in which a user carries out a game operation to a music piece, comprising at least one microprocessor configured to:
   detect a position of a display;
   acquire, from a storage that stores a position of the display and reference time data representing a reference time at which the user should carry out the game operation in association with each other, the reference time data associated with the detected position of the display;
   control the display to display a guidance image for guiding the user regarding the reference time, based on the reference time data associated with the detected position of the display;
   detect the game operation carried out by the user; and
   evaluate, based on the reference time data associated with the detected position of the display and the detected game operation, the game operation carried out by the user.

2. The game device according to claim 1, wherein:
   the reference time data represents a reference time at which the user should carry out each of one or a plurality of types of the game operation; and
   the at least one microprocessor guide the user in each of the one or plurality of types of the game operation by setting guidance areas corresponding to a number of types of the game operation represented by the reference time data associated with the detected position of the display on a game screen displayed on the display, and control each of the set guidance areas to display the guidance image.

3. The game device according to claim 2, wherein the at least one microprocessor guide the user in each of the one or plurality of types of game operation by moving the guidance image in the each of the guidance areas to a target position so that a distance between the guidance image and the target position corresponds to a remaining time before the reference time arrives.

4. The game device according to claim 1, wherein the at least one microprocessor acquire the guidance subject period data from a storage that stores guidance subject period data in which the position of the display and a guidance subject period which is a period for guiding the reference time are associated with each other, and,
   control the display to display the guidance image for providing guidance regarding the reference time in the guidance subject period associated with the detected position of the display.

5. The game device according to claim 1, wherein:
   the music piece includes parts of a plurality of musical instruments; and
   the at least one microprocessor acquire the reference time data corresponding to any one of the parts of the plurality of musical instruments, which is associated with the detected position of the display, from a storage that stores the position of the display and the reference time data corresponding to any one of the parts of the plurality of musical instruments in association with each other.

6. The game device according to claim 1, wherein the at least one microprocessor:
   detect a position of the game device;
   execute game processing corresponding to the detected game operation;
   acquire the reference position data from a storage that stores reference position data in which a situation of the game and a reference position of the game device are associated with each other;
   determine whether or not the detected position of the game device is the reference position associated with the situation of the game being executed; and
   restrict, based on the determination result, the execution of the game processing corresponds to the detected game operation.

7. The game device according to claim 6, wherein:
   the reference position data is data in which a reference situation of the game and the reference position of the game device are associated with each other; and
   the at least one microprocessor determine, in a case where the situation of the game being executed is brought into the reference situation, whether or not the position of the detected game device is the reference position associated with the reference situation.

8. The game device according to claim 7, wherein the at least one microprocessor guide the user to change the position of the game device to the reference position, in the case where the situation of the game being executed is brought into the reference situation.

9. The game device according to claim 6, wherein:
   the reference position data is data in which the situation of the game, the reference position of the game device, and the game operation carried out by the user are associated with one another; and
   the at least one microprocessor restrict, based on the determination result, the execution of the game processing corresponding to the game operation associated with a current situation of the game being executed and the reference position.

10. The game device according to claim 6, wherein the at least one microprocessor control a game screen so that an orientation of the game screen is directed to an orientation corresponding to the reference position associated with a current situation of the game being executed.

11. A method of controlling a game device including at least one microprocessor for executing a game in which a user carries out a game operation to a music piece, the method comprising:
    detecting, by the at least one microprocessor, a position of display;
    acquiring, by the at least one microprocessor, from a storage for store a position of the display and reference time data representing a reference time at which the user should carry out the game operation in association with each other, the reference time data associated with the detected position of the display;
    controlling, by the at least one microprocessor, the display to display a guidance image for guiding the user regarding the reference time, based on the reference time data associated with the detected position of the display;
    detecting, by the at least one microprocessor, the game operation carried out by the user; and evaluating, by the at least one microprocessor, the game operation carried out by the user, based on the reference time data associated with the detected position of the display and the detected game operation.

12. A non-transitory computer readable information storage medium having a program recorded thereon, the program causing a computer to function as a game device for executing a game in which a user carries out a game operation in time with a music piece, the game device comprising:
- a position detection unit that detects a position of display;
- a reference time data acquisition unit that acquires, from a storage that stores a position of the display and reference time data representing a reference time at which the user should carry out the game operation in association with each other, the reference time data associated with the detected position of the display;
- a display control unit that controls the display to display a guidance image for guiding the user regarding the reference time, based on the reference time data associated with the detected position of the display;
- a game operation unit that detects the game operation carried out by the user; and
- a game operation evaluation unit that evaluates the game operation carried out by the user, based on the reference time data associated with the detected position of the display and the detected game operation.

13. A game device for executing a game in which a user carries out a game operation to a music piece, comprising:
- a position detection unit that detects a position of a display;
- a reference time data acquisition unit that acquires, from a storage that stores a position of the display and reference time data representing a reference time at which the user should carry out the game operation in association with each other, the reference time data associated with the position of the display detected by the position detection unit;
- a display control unit that controls the display to display a guidance image for guiding the user regarding the reference time, based on the reference time data associated with the position of the display detected by the position detection unit;
- a game operation detection unit that detects the game operation carried out by the user; and
- a game operation evaluation unit that evaluates, based on the reference time data associated with the position of the display detected by the position detection unit and a detection result by the game operation detection unit, the game operation carried out by the user.

* * * * *